United States Patent
Gu et al.

(10) Patent No.: US 12,196,565 B2
(45) Date of Patent: Jan. 14, 2025

(54) SYSTEMS AND METHODS FOR UTILIZING SIDE-OF-STREET INFORMATION WHILE FULFILLING TRANSPORTATION REQUESTS

(71) Applicant: Lyft, Inc., San Francisco, CA (US)

(72) Inventors: Janie Jia Gu, San Francisco, CA (US); Mayank Gulati, San Francisco, CA (US); Guy-Baptiste Richard de Capele d'Hautpoul, San Francisco, CA (US); Maksim Rozentsveyg, New York, NY (US)

(73) Assignee: Lyft, Inc., Menlo Park, CA (US)

( * ) Notice: Subject to any disclaimer, the term of this patent is extended or adjusted under 35 U.S.C. 154(b) by 1028 days.

(21) Appl. No.: 16/910,110

(22) Filed: Jun. 24, 2020

(65) Prior Publication Data
US 2021/0404824 A1    Dec. 30, 2021

(51) Int. Cl.
*G01C 21/34* (2006.01)
*G01C 21/36* (2006.01)
*G06Q 10/02* (2012.01)
*G06Q 50/40* (2024.01)
*G08G 1/00* (2006.01)

(52) U.S. Cl.
CPC ....... *G01C 21/3461* (2013.01); *G01C 21/362* (2013.01); *G01C 21/3667* (2013.01); *G06Q 10/02* (2013.01); *G06Q 50/40* (2024.01); *G08G 1/202* (2013.01)

(58) Field of Classification Search
CPC .............. G01C 21/3461; G01C 21/362; G01C 21/3667; G01C 21/3423; G01C 21/3438; G06Q 10/02; G06Q 50/30; G08G 1/202
See application file for complete search history.

(56) References Cited

U.S. PATENT DOCUMENTS

| | | | |
|---|---|---|---|
| 11,537,953 B2 * | 12/2022 | Beaurepaire | G06N 7/01 |
| 2018/0338298 A1 * | 11/2018 | Pan | H04W 92/02 |
| 2020/0088531 A1 * | 3/2020 | Kolambekar | G01C 21/20 |
| 2020/0103242 A1 * | 4/2020 | Chachra | G01C 21/3438 |
| 2020/0175632 A1 * | 6/2020 | Vora | G06Q 10/063114 |
| 2021/0223051 A1 * | 7/2021 | Hochberg | G08G 1/123 |
| 2021/0398041 A1 * | 12/2021 | Singh | G01C 21/3438 |

\* cited by examiner

*Primary Examiner* — Anne Marie Antonucci
*Assistant Examiner* — Lidia Kwiatkowska
(74) *Attorney, Agent, or Firm* — Greenberg Traurig, LLP

(57) ABSTRACT

The disclosed computer-implemented method may include (i) receiving, from a transportation requestor device, a request for transportation that comprises a transportation stop at a location next to a street, (ii) matching, by a dynamic transportation matching system, the transportation requestor device with a transportation provider, and (iii) improving, by the dynamic transportation matching system, a value of fulfilling the request by (a) determining that a near side of the street is closer to the location of the transportation stop than a far side of the street, (b) mapping, based on the determination that the near side of the street is closer to the location of the transportation stop, a driving route that traverses the street, and (c) directing the transportation provider to fulfill the request for transportation by traversing the driving route. Various other methods, systems, and computer-readable media are also disclosed.

20 Claims, 15 Drawing Sheets

SYSTEMS AND METHODS FOR UTILIZING SIDE-OF-STREET INFORMATION WHILE FULFILLING TRANSPORTATION REQUESTS

BACKGROUND

On-demand transportation, which may allow a user to request transportation from a dynamic transportation network at any time, is becoming an increasingly popular method of getting around. A user can access a transportation-network application on their mobile device to request transportation from their current location to their destination and, in response, the transportation network may fulfill the request by selecting a transportation provider to fulfill the request. In some cases, a transportation provider may pick a user up at the user's current location and transport the user directly to the user's destination. In other cases, it may be more convenient for a user to meet the transportation provider at a location that is not the user's current location or for the transportation provider to drop the user off at a location that is not the user's destination.

Unfortunately, determining the relative convenience or other value of a large number of potential different pick-up and drop-off points and routes to and from such points may be a computationally intensive problem. Some traditional systems for matching transportation requestors and transportation providers may avoid the problem entirely, missing out on the potential user experience improvement gained by more flexible pick-up and drop-off locations. Accordingly, the instant disclosure identifies and addresses a need for additional and improved systems and methods for selecting improved routes for fulfilling transportation requests.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
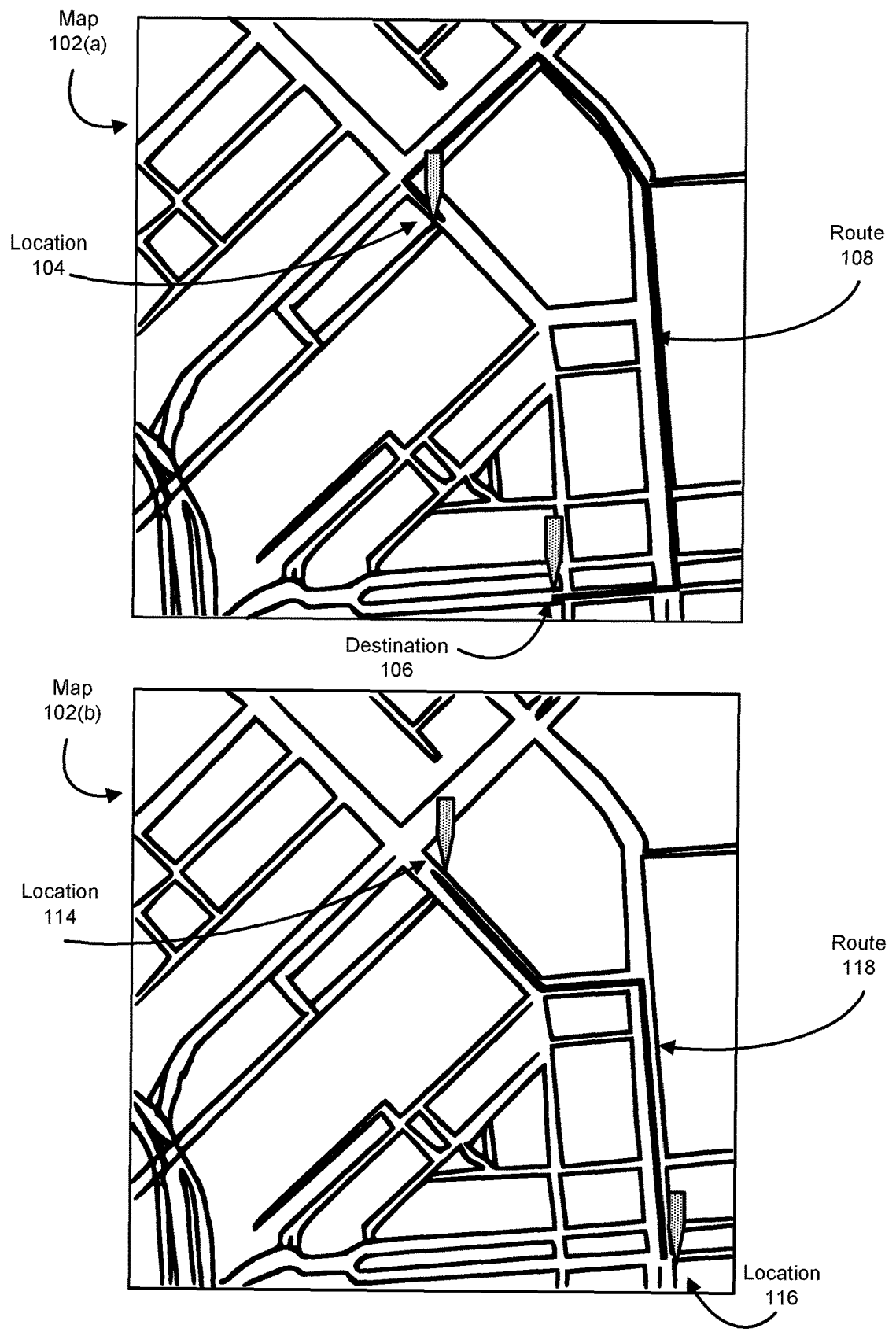
FIG. 1 is an illustration of example routes for fulfilling a transportation request.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to various novel approaches to calculating, implementing, and/or optimizing value metrics for a dynamic transportation matching system. By adding a pre-pickup and/or post-drop-off walk to a route for a trip, the systems described herein may minimize the total trip time, improve the user experience, minimize driver idle time, minimize provider difficulty in traversing a provided route, maximize user convenience in meeting a requested provider, and/or improve other value metrics. In some embodiments, the systems described herein may surface a user interface (UI) toggle that may enable a user to indicate that the user has opted into a pre-pickup or post-drop-off walk. Upon receiving, via the UI toggle, user permission to include walks, the systems described herein may present a UI that includes one or more potential walking routes, alternate pick-up and/or drop-off locations, estimated arrival time (ETA) difference with and without a pre-pickup walk, and/or other information that enables a user to conveniently meet a transportation provider.

Additionally or alternatively, the systems described herein may optimize waypoints and/or routes by accounting for the side of the street on which the user is being picked up and/or dropped off. In some embodiments, the systems described herein may incorporate waypoints and/or routes optimized with side-of-street information in provider navigation and/or ETA displayed to riders and drivers. By accounting for the side of the street of a transportation requestor, the systems described herein may generate routes that are more optimal for providers (e.g., fewer turns, less time traveling to meet the requestor, shorter routes, etc.) and/or more convenient for users (e.g., shorter trips, more accurate ETAs, etc.).

Accordingly, as may be appreciated, the systems and methods described herein may improve the functioning of a computer that dynamically matches transportation requestors with transportation providers by enabling the computer to generate improved and/or more optimal routes. Furthermore, for the reasons mentioned above and to be discussed in greater detail below, the systems and methods described herein may provide advantages to the field of transportation by improving efficiency of a dynamic transportation matching system and/or improving a user experience of interacting with the dynamic transportation matching system.

As will be explained in greater detail below, a dynamic transportation matching system may arrange transportation on an on-demand and/or ad-hoc basis by, e.g., matching one or more transportation requestors and/or transportation requestor devices with one or more transportation providers and/or transportation provider devices. For example, a dynamic transportation matching system may match a transportation requestor to a transportation provider that operates within a dynamic transportation network (e.g., that is managed by, coordinated by, and/or drawn from by the dynamic transportation matching system to provide transportation to transportation requestors).

In some examples, available sources of transportation within a dynamic transportation network may include vehicles that are owned by an owner and/or operator of the dynamic transportation matching system. Additionally or alternatively, sources of transportation within a dynamic transportation network may include vehicles that are owned outside of the dynamic transportation network but that participate within the dynamic transportation network by agreement. In some examples, the dynamic transportation network may include lane-bound vehicles (e.g., cars, light trucks, etc.) that are primarily intended for operation on roads. Furthermore, the dynamic transportation network may include personal mobility vehicles (PMVs) and/or micro-mobility vehicles (MMVs) that are not bound to traditional road lanes, such as scooters, bicycles, electric scooters, electric bicycles, and/or any other suitable type of PMV and/or MMV. In some embodiments, a dynamic transportation network may include autonomous vehicles (e.g., self-driving cars) that may be capable of operating with little or no input from a human operator.

In some embodiments, adding a pre-pickup and/or post-drop-off walk to a trip may result in significant improvements in ETA, estimated time to destination (ETD), and/or other metrics. FIG. 1 illustrates an example map 102(a) with an example route 108 for fulfilling a transportation request. In one example, a transportation requestor may be currently located at a location 104 and may be requesting transportation to a destination 106. Due to one-way streets, restricted turns, and/or other factors, route 108 between location 104 and destination 106 may be nearly a mile long and may take six minutes for a transportation provider to traverse. However, if the transportation requestor is willing to cross the street from location 104 to a location 114, as shown on map 102(b), and to walk to destination 106 from the nearest street corner, location 116, then the resulting route 118 may be only half a mile long and may take only four minutes for the transportation provider to traverse. In this example, by taking the minimally inconvenient step of crossing the street before pickup and walking a short distance after drop-off, the transportation requestor may enjoy a shorter trip and improved user experience. In some embodiments, the systems described herein may calculate alternate waypoints for pickup and/or drop-off that account for side-of-street information and/or improve ETA, ETD, trip complexity (e.g., in terms of number of turns, total amount of route legs, and/or number of directions that a requestor and/or provider must follow to traverse the route), and/or other metrics, facilitating a better user experience for transportation requestors and transportation providers as well as improved metrics for the dynamic transportation matching system.

The term "waypoint," as used herein, may generally refer to any location that is or may be part of a driving, walking, and/or other type of transportation route. In some embodiments, a waypoint may be described in terms of coordinates, such as global positioning system coordinates. Additionally or alternatively, a waypoint may be described in terms of a street address. In some examples, a waypoint may be received as input from a transportation requestor device. For example, a transportation requestor device may send a transportation request that includes a pickup waypoint (e.g., the current location of the transportation requestor) and/or a drop-off waypoint (e.g., a destination). In some examples, a waypoint may include an intermediate location on a route, such as a turn at a particular street corner. In some examples, the term "transportation stop" may refer to a waypoint at which a transportation provider is expected to stop (e.g., to pick up and/or drop off a requestor), as opposed to a waypoint at which a transportation provider is not expected to stop, such as an intermediate waypoint.

Figure 2:
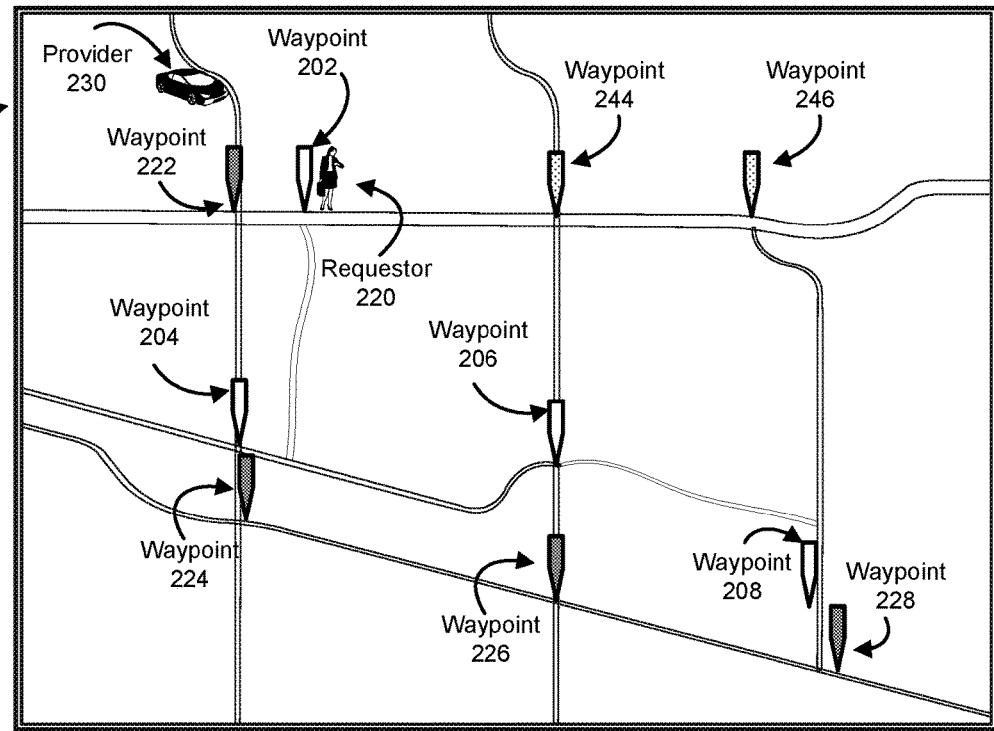
FIG. 2 is an illustration of an example set of waypoints on a map and a corresponding graph.
Figure 2:
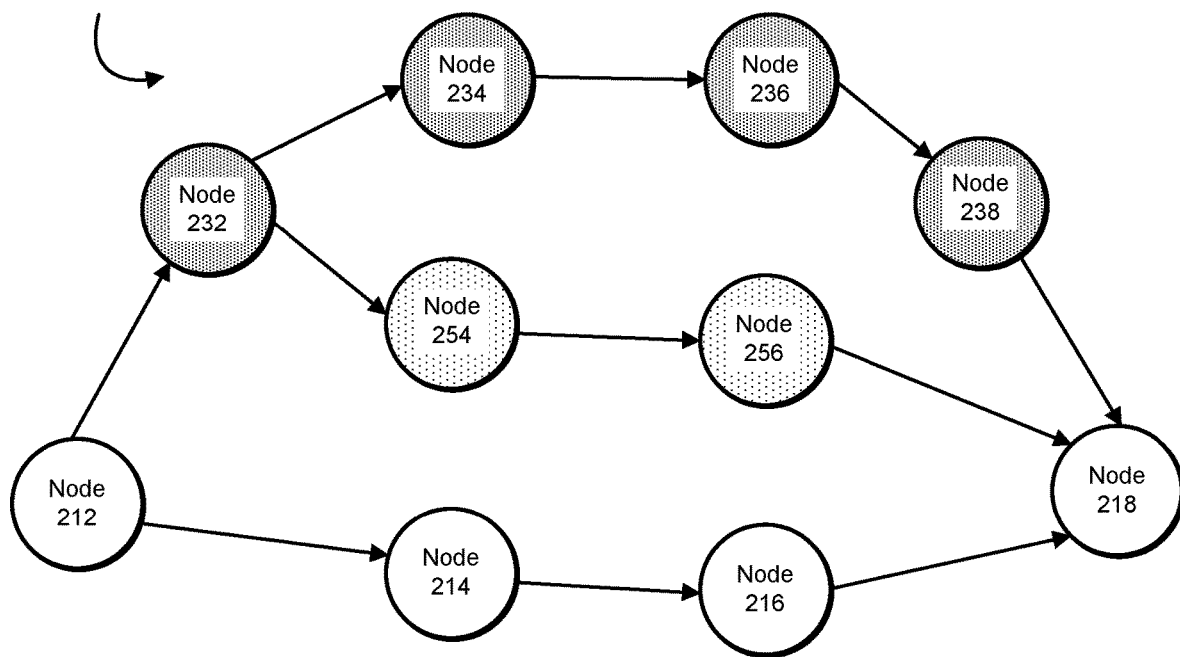

In some embodiments, the systems described herein may generate a set of alternate waypoints and may represent the potential waypoints (e.g., the original waypoints and the alternate waypoints) as vertices and/or nodes of a graph, where an edge between a pair of vertices or nodes may represent a route (or portion of a route) between the respective potential waypoints. For example, as illustrated in FIG. 2, the systems described herein may match a device associated with a requestor 220 with a provider 230 to transport requestor 220 from a waypoint 202 to a waypoint 208. In one example, as shown on map 200, waypoint 202, waypoint 204, waypoint 206, and/or waypoint 208 may be the initial waypoints on an initial route between waypoint 202 and waypoint 208. In some examples, waypoint 222, waypoint 224, waypoint 226, and/or waypoint 228 may represent alternate waypoints on an alternate route that involves a pre-pickup and/or post-drop-off walk for requestor 220. In one example, waypoint 244 and/or waypoint 246 may represent alternative waypoints on an additional alternate route.

In some embodiments, the systems described herein may construct a graph 210 where each potential waypoint is represented by a node or vertex and each route or path between a pair of waypoints is represented by an edge between a respective pair of nodes or vertices. For example, node 212, node 214, node 216, and/or node 218 may represent waypoint 202, waypoint 204, waypoint 206, and/or waypoint 208, respectively; node 232, node 234, node 236, and/or node 238 may represent waypoint 222, waypoint 224, waypoint 226, and/or waypoint 228, respectively; and node 254 and/or node 256 may represent waypoint 244 and/or waypoint 246, respectively. Furthermore, by way of illustration, an edge between node 212 and node 214 may represent a route or path from waypoint 202 to waypoint 204, an edge between node 214 and node 216 may represent a route or path from waypoint 204 to waypoint 206, and so forth. In one embodiment, graph 210 may be an undirected graph. Additionally or alternatively, graph 210 may be a directed graph (i.e., where edges have directionality). In some embodiments, graph 210 may be a k-complete graph where each node and/or waypoint is connected by an edge to each other node and/or waypoint. In other embodiments, graph 210 may not be k-complete and nodes may only be connected via edges to geographically adjacent nodes and/or geographically adjacent waypoints (e.g., nodes within a predetermined distance) and/or nodes and/or waypoints that are part of the same predetermined route.

Figure 3:
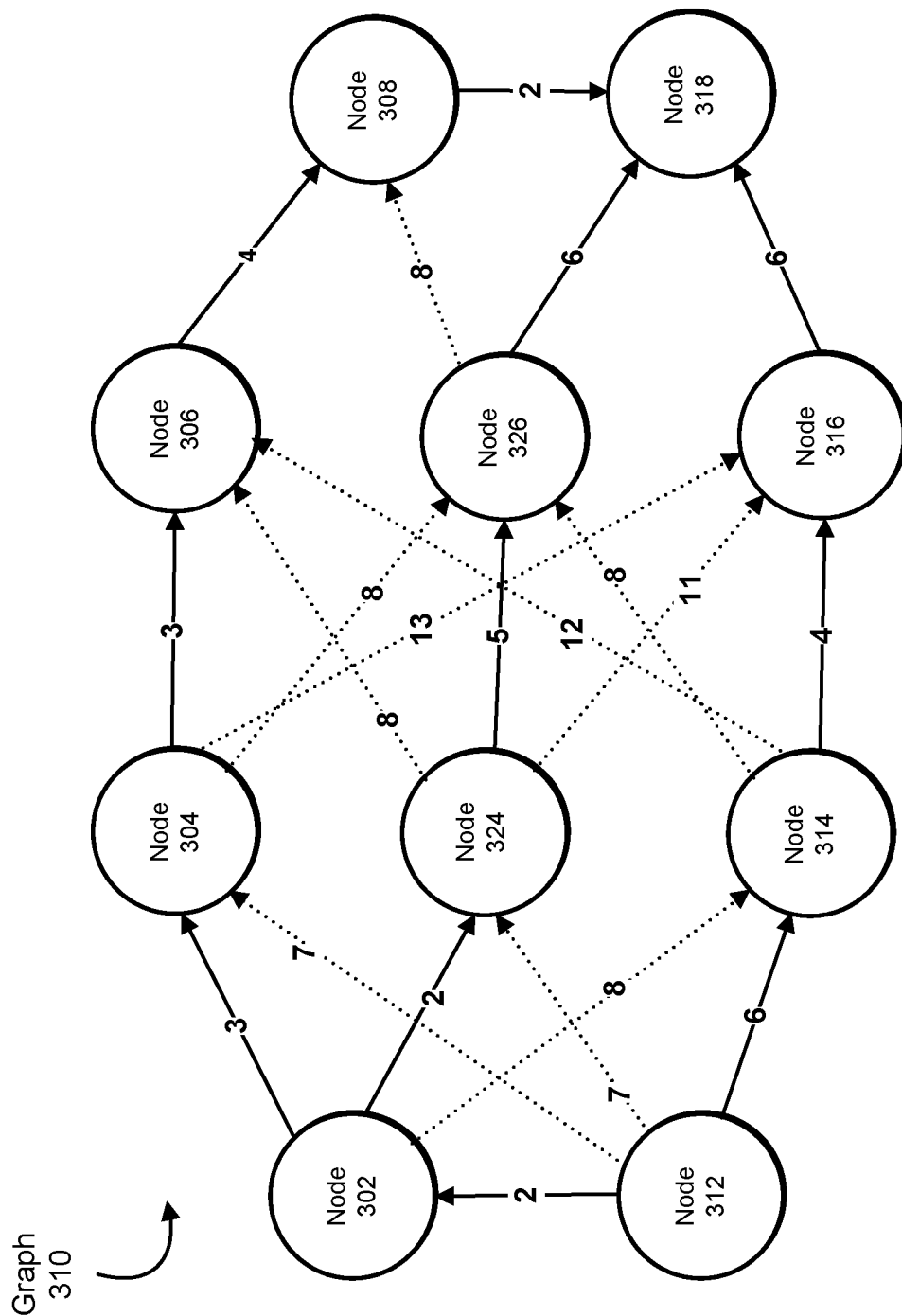
FIG. 3 is an illustration of an example graph representing potential waypoints for fulfilling a transportation request.

In some embodiments, the systems described herein may prune the graph by removing edges to arrive at a directed acyclic graph. In one embodiment, the systems described herein may prune the graph based at least in part on the weight of edges, where the weight represents a cost (e.g., in terms of time, distance, complexity, and/or other factors) associated with traveling between the waypoints represented by the nodes (e.g., a cost of traversing a route between the waypoints, or a "traversal cost"). In one embodiment, the weight of an edge may represent a combined cost for a provider and a requestor of including the edge (e.g., the route between the two waypoints joined by the edge) in the route. For example, as illustrated in FIG. 3, a graph 310 may include node 302, node 304, node 306, node 308, node 312, node 314, node 316, node 318, node 324, and/or node 326 that represent waypoints. In one embodiment, the edges between the nodes may be weighted according to the estimated travel time in minutes to traverse the distance between the waypoints represented by the nodes. For example, the edge between node 302 and node 304 may have a weight of "3" to represent the cost of traversing the distance between the corresponding waypoints represented by node 302 and node 304, the edge between node 302 and node 324 may have a weight of "2" to represent the cost of traversing the distance between the corresponding waypoints represented by node 302 and node 324, and so forth. The systems described herein may select edges to prune in a variety of ways. In one embodiment, the systems described herein may determine (e.g., identify, calculate, receive an indication of, etc.) the two edges connected to each node with the most favorable weights (e.g., the lowest travel time) and may prune the remaining edges. In other embodiments, the systems described herein may determine the single edge with the most favorable weight, three edges with the most favorable weights, etc., and prune the remaining edges. In some embodiments, the systems described herein may identify nodes that represent favorable waypoints (e.g., from a list of favorable waypoints and/or based on characteristics of the waypoints such as location near other waypoints) and may prune fewer edges connecting nodes that represent favorable waypoints. Additionally or alternatively, the systems described herein may prune edges with unfavorable weights such that a set number of routes (e.g., two routes, three routes, etc.) may remain through the graph from a node that represents a starting waypoint to a node that represents a destination waypoint. In one embodiment, the systems described herein may prune the graph such that the edges that represent a route with no pre-pickup or post-drop-off walk remain in the graph after pruning. For example, the systems described herein may prune the graph such that edges representing one walk-enabled route and one non-walk-enabled route remain in the graph after pruning and all other edges are removed. In some examples, the results of pruning the graph may not yield the most optimal route (e.g., the route with the lowest total travel time) but may yield a route within a range (e.g., top ten, top 11%, top third, etc.) of optimal possibilities.

In some embodiments, after pruning a graph with nodes that represent waypoints, the systems described herein may pass the resulting routes generated by the pruned graph to a function that determines which route most effectively satisfies one or more constraints (e.g., likelihood of being accepted by the transportation requestor, travel time, travel distance, complexity, monetary cost, interactions with other trips, convenience, user experience, etc.) for fulfilling transportation requests.

Figure 4:
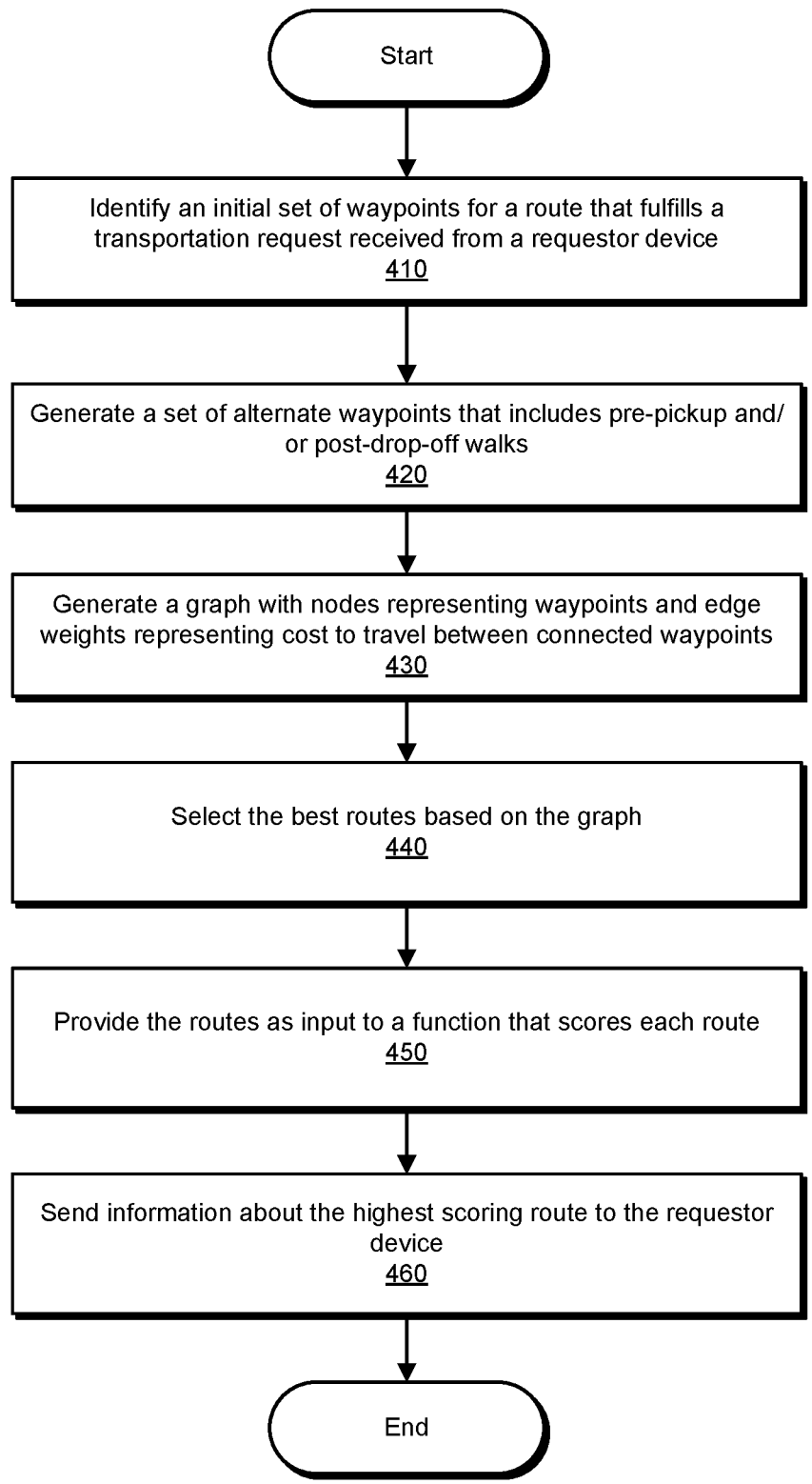
FIG. 4 is a flow diagram of an example method for selecting improved routes for fulfilling transportation requests.

For example, as illustrated in FIG. 4, at step 410, the systems described herein may identify an initial set of waypoints for a route that fulfills a transportation request received from a requestor device. For instance, the systems described herein may identify a waypoint that is a transportation requestor's current location, a waypoint that is the destination for the transportation request, and/or one or more in-between waypoints.

At step 420, the systems described herein may generate a set of alternate waypoints that includes pre-pickup and/or post-drop-off walks. In some examples, adding a pre-pickup and/or post-drop-off walk may enable identification or designation of a route with different in-between waypoints, such as a route that avoids U-turns, one-way streets, and/or other navigational obstacles.

At step 430, the systems described herein may generate a graph with nodes representing waypoints and edge weights representing cost (e.g., in terms of time, distance, and/or other constraints) to travel between connected waypoints. In some embodiments, the systems described herein may generate an initial graph where each waypoint is connected to each adjacent waypoint in a potential route from a starting waypoint to a destination waypoint. In some examples, the systems described herein may heuristically prune the graph such that edges representing a limited number of routes (e.g., two routes, three routes, etc.) remain. For example, the systems described herein may identify at least two routes through the graph from a set of vertices representing potential starting waypoints to a set of vertices representing potential destination waypoints. In some examples, the routes may include at least an initial driving route between the initial waypoints and a walk-enabled driving route.

At step 440, the systems described herein may select the best routes based on the graph. For example, the systems described herein may select the routes with the lowest total traversal cost (e.g., based on edge weights). In one embodiment, the systems described herein may use a graph search algorithm, such as Djikstra's algorithm, to identify a shortest path between a starting node and a destination node. In one example, the systems described herein may use a modified version of Djikstra's algorithm that returns the top n results of shortest paths between the starting node and the destination node.

At step 450, the systems described herein may provide at least two routes as input to an objective function that produces, as output, a value metric for each route. Furthermore, the systems described herein may maximize and/or minimize predetermined value metrics. For example, the systems described herein may maximize and/or minimize an objective function that scores a likelihood that a transportation requestor will accept a route and/or match. In another example, the systems described herein may maximize and/or minimize one or more objective functions that produce, as output, ETA, ETD, monetary cost, and/or other metrics associated with each route. In some embodiments, an objective function may maximize a single metric at the expense of other metrics. Additionally or alternatively, an objective function may prioritize multiple metrics at different levels of priority.

At step 460, the systems described herein may send information about the highest scoring route, as determined by an objective function, to the requestor device. In some examples, the systems described herein may then receive an opt-in message from the requestor device accepting the route. In other examples, the requestor device may have previously opted in to having requests for transportation fulfilled via walk-enabled driving routes. In some examples, the systems described herein may then match the requestor device with a transportation provider based at least in part on a score of the route. For example, the systems described herein may match the requestor device with a transportation provider based on the highest-scored route (e.g., the systems described herein may match the requestor device with a transportation provider capable of traversing the route as opposed to a different transportation provider not capable of traversing the route due to current location and/or other constraints). In some embodiments, the systems described herein may send directions for following the route to the requestor device and/or provider device.

Figure 5:
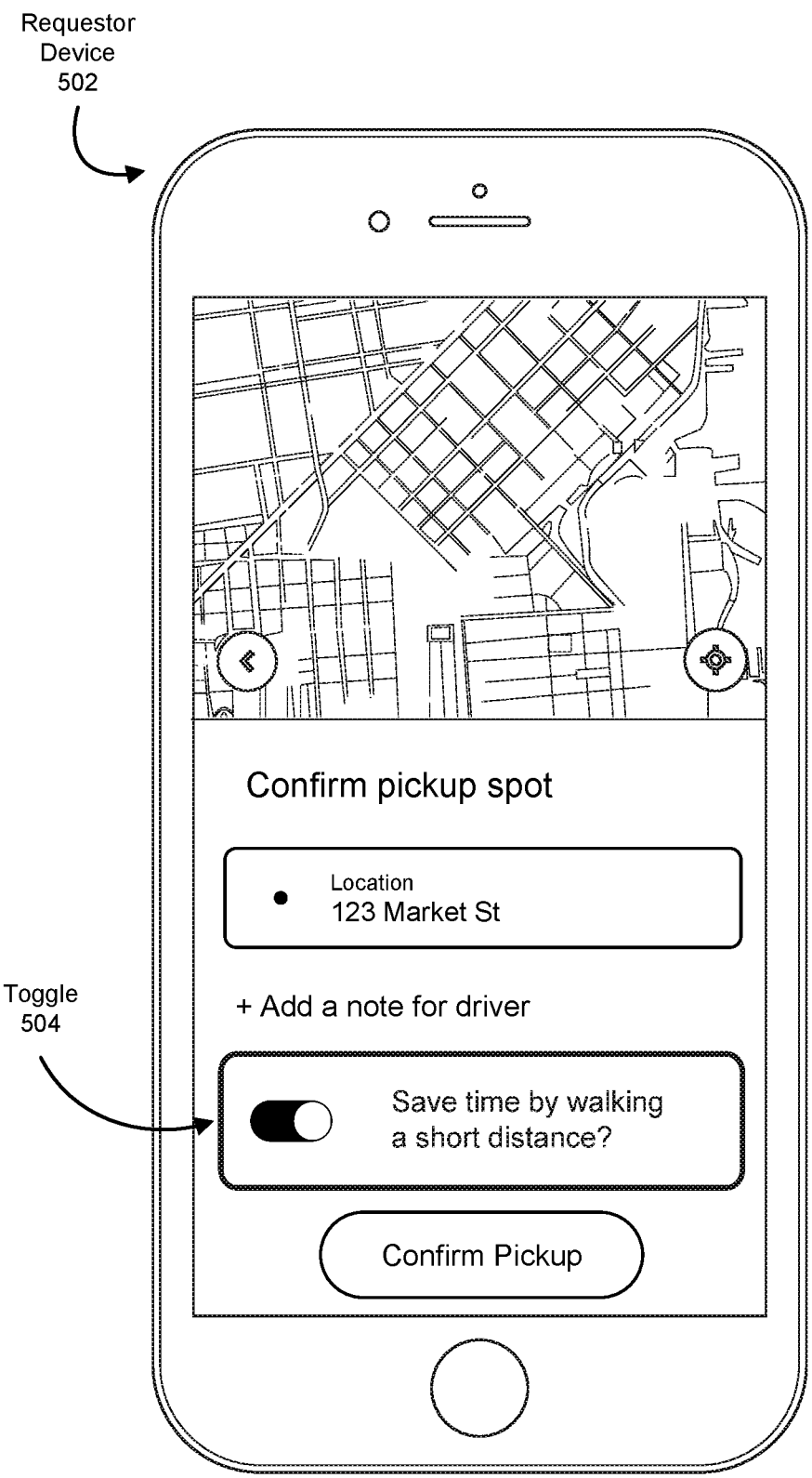
FIG. 5 is an illustration of an example graphical user interface for fulfilling transportation requests.

In some embodiments, the systems described herein may display a control in a UI to enable a user to opt in to walk-enabled driving routes. For example, the systems described herein may display a toggle, a checkbox, and/or any other relevant UI element. FIG. 5 illustrates an example UI for opting into optional walks. In one example, when a transportation requestor initiates a request for transportation via a requestor device 502, the systems described herein may direct requestor device 502 to display a toggle 504 that enables the transportation requestor to opt into pre-pickup and/or post-drop-off walks. In some embodiments, the systems described herein may store the transportation requestor's preference and may default to that preference in the future. For example, if the transportation requestor sets toggle 504 to opt-in to walks, the systems described herein may save toggle 504 in the opt-in position and/or may perform future route and/or matching calculations with the assumption that the transportation requestor accepts pre-pickup and/or post-drop-off walks.

In some embodiments, the systems described herein may direct requestor device 502 to display toggle 504 before matching requestor device 502 with a transportation provider. Additionally or alternatively, the systems described herein may direct requestor device 502 to display toggle 504 after matching requestor device 502 with a transportation provider but before directing requestor device 502 to display a route for fulfilling the transportation request. In some embodiments, the systems described herein may direct requestor device 502 to display toggle 504 in a preferences screen that is separate from the transportation request UI flow. In one embodiment, the systems described herein may not direct requestor device 502 to display toggle 504 in the transportation request UI flow if the transportation requestor has previously opted in to walks. In some embodiments, the systems described herein may direct requestor device 502 to display toggle 504 in conjunction with ETA, ETD, and/or additional information about the trip with and without optional walks. For example, the systems described herein may direct requestor device 502 to display toggle 504 in conjunction with information that shows a shorter ETA and/or ETD and/or a less complex route (e.g., in terms of turns, legs, etc.) if the transportation requestor opts in to walks.

In some embodiments, the systems described herein may not direct requestor device 502 to display toggle 504 and/or may not include walks in the route if the request for transportation has certain characteristics. For example, the systems described herein may not prompt for or include walks if the pickup and/or drop-off is at a location classified as a venue (e.g., sporting arena, concert venue, etc.). In another example, the systems described herein may not prompt for or include walks during certain times (e.g., late at night) and/or environmental conditions (e.g., rain, high temperatures, and/or low temperatures). In some embodiments, the systems described herein may not prompt for or include walks if certain conditions for the dynamic transportation network are present (e.g., high transportation provider availability).

In some examples, the systems described herein may effectively interoperate with one or more forms of assistive technology enabled and/or offered by and/or via requestor device 502, such as screen reader systems, screen magnification systems, braille displays, assistive listening devices, hearing aids, and so forth. In one embodiment, in order to avoid transportation requestors with screen readers accidentally accepting walks, the systems described herein may not direct requestor device 502 to display toggle 504 if requestor device 502 is configured with an enabled screen reader.

Additionally or alternatively, the systems described herein may only prompt for or include walks for transportation requests with certain characteristics. In some examples, the systems described herein may only prompt for and/or include walks if the walking distance, time, complexity (e.g., number of turns), and/or other metrics are within a certain ratio of the distance, time, complexity, and/or other metrics of the trip as a whole and/or the trip with the walk included. For example, the systems described herein may only prompt for or include a walk in a trip if every one minute of walking reduces the overall trip time by at least one minute. In another example, the systems described herein may only prompt for or include a walk if every thirty seconds of walking reduces the overall trip time by at least one minute.

In some examples, the systems described herein may only prompt for or include a walk if the walk would improve the metrics of the trip by a minimum amount, such as reducing ETD by at least sixty seconds, reducing the cost of the trip by a set monetary amount, and/or reducing re-routing of the transportation provider by at least one trip segment. In some embodiments, the systems described herein may only prompt for or include a walk if the potential walk meets certain constraints, such as being below a certain distance and/or estimated travel time (e.g., half a mile and/or five minutes). In one embodiment, the systems described herein may only prompt for or include a walk if the systems described herein calculate (e.g., based on previous behavior of the transportation requestor and/or transportation requestors in similar situations) that the probability of the transportation requestor accepting the walk is above a certain threshold (e.g., 30%, 50%, 70%, etc.).

Figure 6:
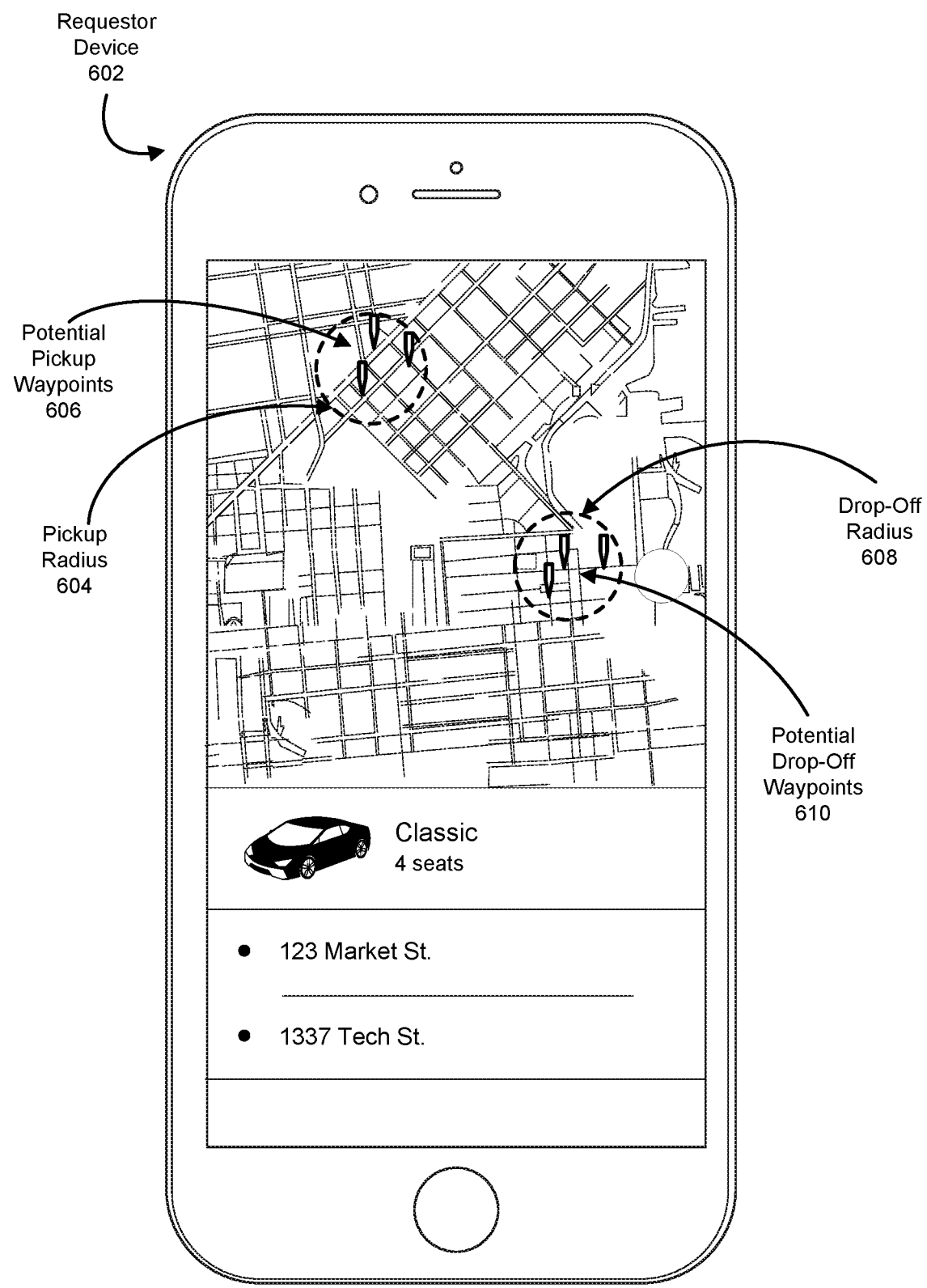
FIG. 6 is an illustration of an additional example graphical user interface for fulfilling transportation requests.

In some embodiments, the systems described herein may direct a requestor device to display potential pick-up and/or drop-off points. For example, as illustrated in FIG. 6, the systems described herein may direct a requestor device 602 to display, on a map within the UI, information about potential pick-up and/or drop-off points. The systems described herein may direct requestor device 602 to display this information at various points in the transportation request UI flow. For example, the systems described herein may direct requestor device 602 to display this information before matching requestor device 602 with a transportation provider. Additionally or alternatively, the systems described herein may direct requestor device 602 to display this information after matching but before determining a route. In some embodiments, the systems described herein may direct requestor device 602 to display this information in conjunction with a toggle to enable walks. Additionally or alternatively, the systems described herein may direct requestor device 602 to display this information after a user has opted in to walks.

In one embodiment, the systems described herein may direct requestor device 602 to display a pickup radius 604 and/or a drop-off radius 608 that illustrate a maximum potential distance the transportation requestor may be required to walk to or from a pickup and/or drop-off waypoint. In one embodiment, pickup radius 604 may be centered on the transportation requestor's current location and/or drop-off radius 608 may be centered on the destination of the transportation request. Additionally or alternatively, the systems described herein may direct requestor device 602 to display one or more potential pickup waypoints 606 and/or potential drop-off waypoints 610. In some embodiments, potential pickup waypoints 606 and/or potential drop-off waypoints 610 may be waypoints that the systems described herein have calculated as efficient pickup and/or drop-off locations (e.g., efficient for the transportation requestor, the transportation provider, and/or for fulfilling other constraints).

In some embodiments, the systems described herein may enable the transportation requestor to select and/or move waypoints (e.g., via a touchscreen interface on requestor device 602). In other embodiments, potential pickup waypoints 606 and/or potential drop-off waypoints 610 may be displayed for informational purposes and the systems described herein may not enable the user to change potential pickup waypoints 606 and/or potential drop-off waypoints 610. In some embodiments, once the systems described herein have determined a route, the systems described herein may direct requestor device 602 to cease displaying pickup radius 604, drop-off radius 608, potential pickup waypoints 606 and/or potential drop-off waypoints 610 and to instead display the selected waypoints for pickup and/or drop-off. In some embodiments, the systems described herein may enable the transportation requestor to opt out of walking (e.g., via a UI element displayed on requestor device 602) after seeing the pickup and/or drop-off radius and/or potential pickup and/or drop-off waypoints.

Figure 7:
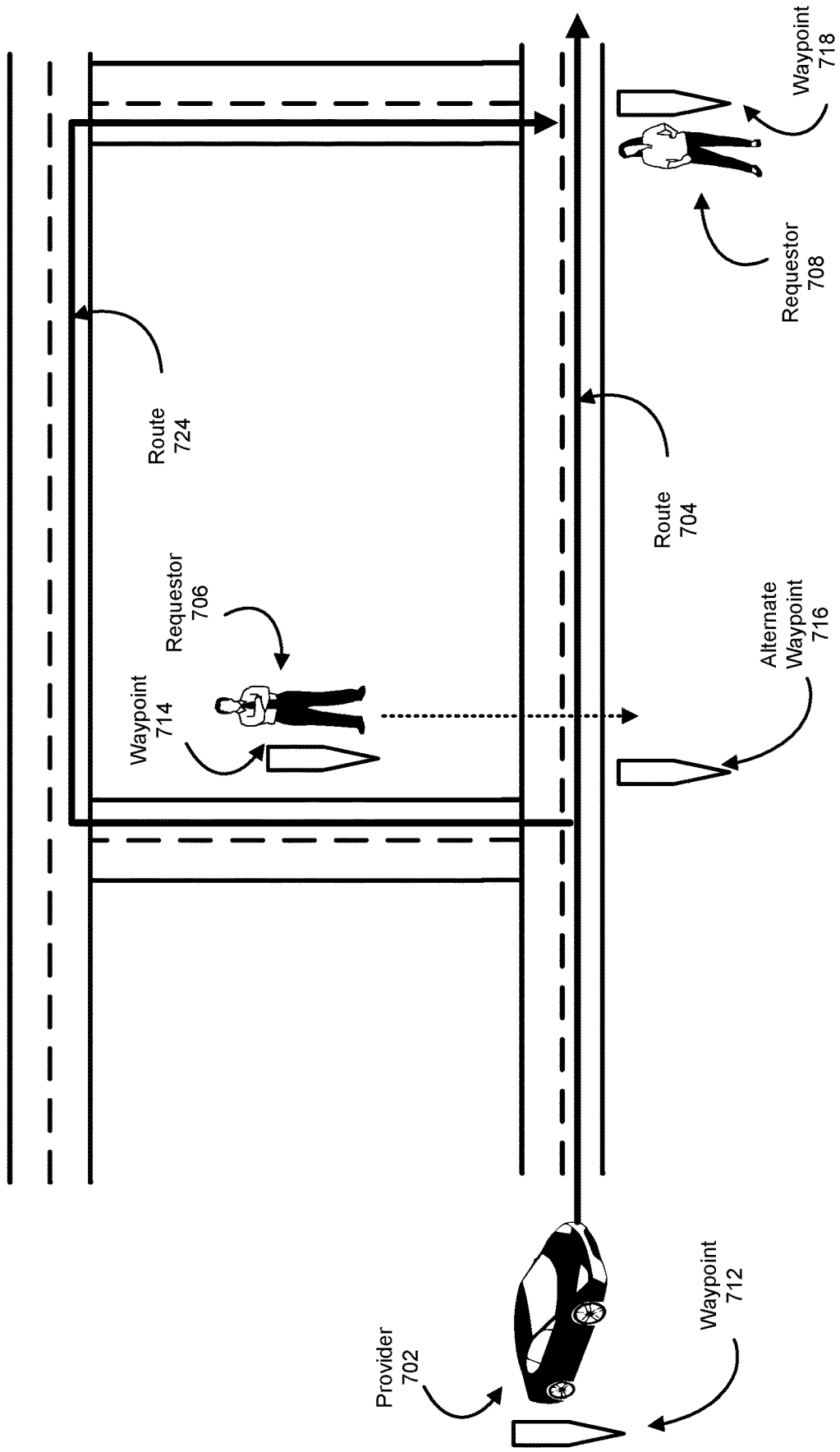
FIG. 7 is an illustration of example routes for fulfilling multiple transportation requests.

In some embodiments, the systems described herein may select waypoints based at least in part on future requests and/or future waypoints that are part of the route and/or additional routes expected to be traversed by the same requestor and/or provider. For example, as illustrated in FIG. 7, a transportation provider 702 at a waypoint 712 may be assigned and/or may have accepted a task of picking up or dropping of a requestor 706 before picking up or dropping off a requestor 708. In one example, requestor 706 may currently be located at or may specify a destination of waypoint 714. However, because provider 702 may be expected to continue on to a waypoint 718 to fulfill a future transportation request from requestor 708 (e.g., a request received and/or designated to be fulfilled after the transportation requestor from requestor 706), it may be more efficient for provider 702 to traverse a route 704 that includes an alternate waypoint 716 than to traverse a route 724 that includes waypoint 714. In some examples, the systems described herein may create a route for requestor 706 that involves a walk from alternate waypoint 716 to alternate waypoint 714. In some embodiments, the systems described herein may select route 704 in response to calculating that a value metric for route 704 is more favorable than a value metric for route 724.

Figure 8:
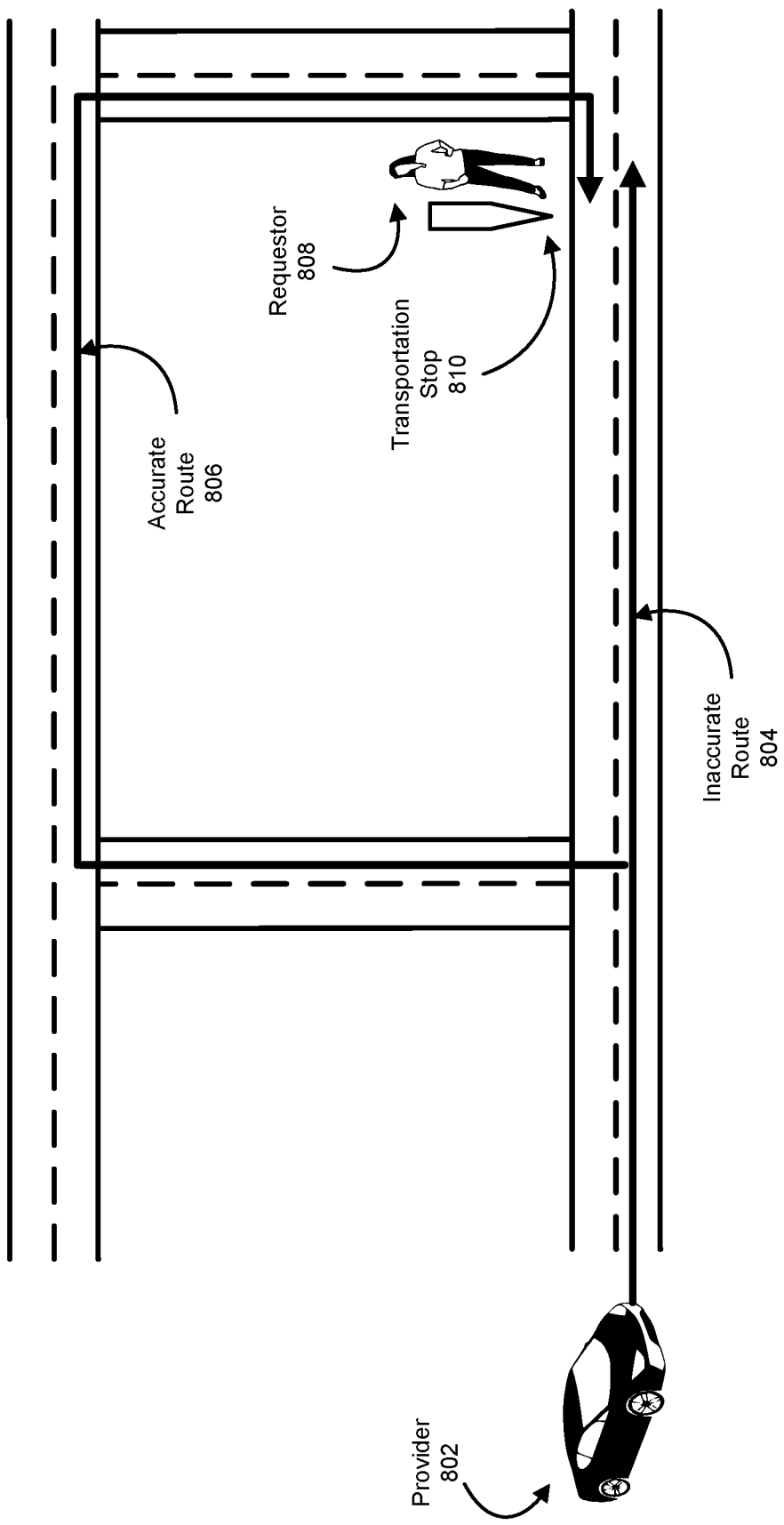
FIG. 8 is an illustration of example routes for fulfilling a transportation request.

In some embodiments, the systems described herein may use information about the side of the street on which a waypoint is located in order to improve routing, display more accurate ETAs, and/or optimize other metrics. For example, as illustrated in FIG. 8, a transportation provider 802 may be matched with a requestor device associated with a requestor 808 who is located at a transportation stop 810. If a conventional transportation matching system does not have information about on which side of the street transportation stop 810 is located, the conventional transportation matching system may direct provider 802 to traverse inaccurate route 804 and/or may direct a provider device and/or requestor device to display inaccurate route 804 in a UI. If the conventional transportation matching system calculates an ETA and/or ETD based on inaccurate route 804, the conventional transportation matching system may convey the inaccurate ETA and/or ETD to transportation requestor 808, leading to a poor user experience and possibly a cancellation of the transportation request. However, with the information that transportation stop 810 is located on the far side of the street from provider 802, one or more of the dynamic transportation matching systems described herein may identify an accurate route 806. In some examples, the systems described herein may direct the provider device and/or requestor device to display accurate route 806 in a UI and/or may calculate an ETA and/or ETD based on accurate route 806 that is more accurate than an ETA and/or ETD calculated based on inaccurate route 804.

Figure 9:
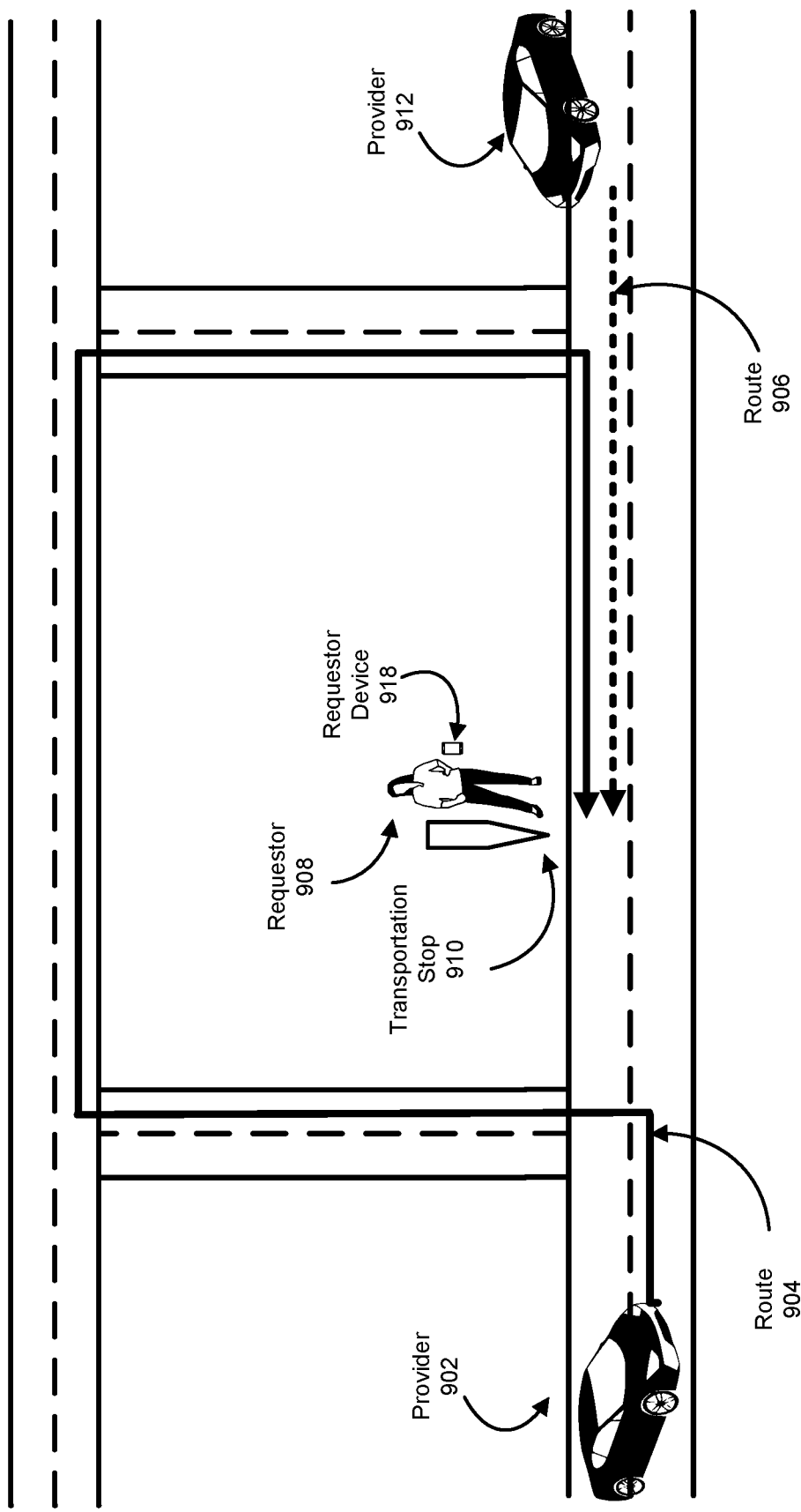
FIG. 9 is an illustration of additional example routes for fulfilling a transportation request.

In some embodiments, the systems described herein may match a transportation requestor device with a transportation provider at least in part based on the side of street on which a transportation stop requested by the requestor device is located and/or a current bearing of the transportation provider. For example, as illustrated in FIG. 9, the systems described herein may receive a transportation request from a requestor device 918 to meet a requestor 908 at a transportation stop 910. In one example, a provider 902 may be located closer to transportation stop 910 than a provider 912. As conventional transportation matching systems do not take into account the side of the street on which transportation stop 910 is located and the bearing of providers 902 and 912, a conventional transportation matching system may select provider 902 to fulfill the transportation request based on provider 902 being closer to transportation stop 910. However, the conventional transportation matching system may therefore require provider 902 to traverse a route 904 that involves several turns and/or perform an illegal U-turn to meet requestor 908, while provider 912 may have to traverse a relatively short and simple route 906 to meet requestor 908. In some embodiments, the dynamic transportation matching systems described herein may map route 904 and/or route 906 while taking into account the bearings of providers 902 and/or 912 and the side of the street on which transportation stop 910 is located. In one embodiment, the systems described herein may select provider 912 to fulfill the transportation request based at least in part on route 906 being shorter (in terms of time and/or distance) and/or simpler than route 904. In some examples, the systems described herein may calculate that provider 912 has a sooner ETA to meet requestor 908 than the ETA for provider 902 to meet requestor 908.

In some examples, the systems described herein may match provider 912 with requestor device 918 in response to determining that transportation stop 910 is closer to the near side of the street (e.g., relative to provider 912) than the far side of the street. In one embodiment, the systems described herein may direct provider 912 to traverse the near side of the street when meeting requestor 908. In one embodiment, the systems described herein may send an ETA to a requestor device 918 calculated based at least in part on transportation stop 910 being closer to the near side of the street.

In some embodiments, the systems described herein may send information to an application programming interface (API) to determine ETA, map a route, and/or display a route on a requestor and/or provider device in a UI that includes a map. For example, the systems described herein may send, to an API of a mapping server, the current bearing of the transportation provider and/or information that the transportation stop is closer to the near side of the street. In some embodiments, the systems described herein may receive, from the API, a route and/or instructions for displaying the route on a map in a UI. In some embodiments, the systems described herein may direct the requestor device and/or provider device to display the route on a map such that the route visibly traverses the side of the street nearest the transportation stop.

Figure 10:
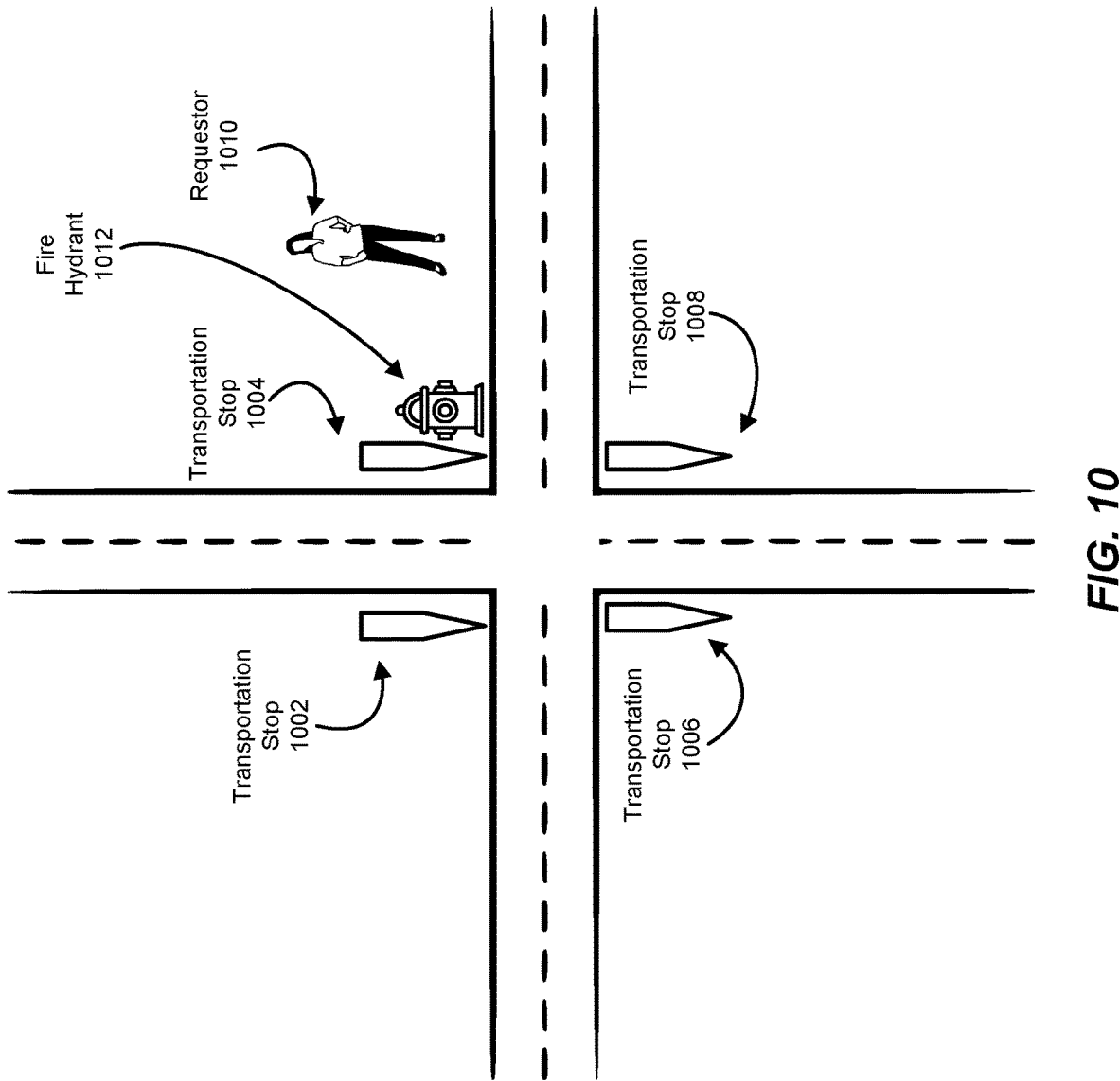
FIG. 10 is an illustration of example transportation stops for a transportation request.

In some embodiments, the systems described herein may direct a transportation requestor to meet a provider at an alternate transportation stop, such as on a different side of the street than the side of the street nearest to the initial transportation stop. For example, as illustrated in FIG. 10, a requestor 1010 may be located near a transportation stop 1004. In one example, transportation stop 1004 may be an unauthorized location for a transportation provider to stop. For example, transportation stop 1004 may include and/or be adjacent to a fire hydrant 1012. In other examples, transportation stop 1004 may include and/or be adjacent to a zone in which providers are not permitted to stop, such as a fire zone, a zone where some transportation providers (e.g., rideshare drivers) are explicitly banned, and/or any other type of unauthorized zone. In some examples, the systems described herein may direct transportation requestor 1010 (e.g., by sending a message to a requestor device associated with requestor 1010) to traverse a route to a transportation stop 1002, transportation stop 1006, and/or transportation stop 1008 in response to determining that transportation stop 1004 is an unauthorized location.

In some embodiments, the systems described herein may map a route that includes the alternative transportation stop and may direct a requestor device and/or provider device to display the route that includes the alternative transportation stop. In some examples, the systems described herein may map a route that includes an alternative transportation stop on another side of the street for other reasons. For example, the systems described herein may determine that a route that includes the alternative transportation stop has a higher value (e.g., in terms of time, distance, effect on requestors/providers, etc.) than a route that includes the initial transportation stop. In some embodiments, the systems described herein may map, in response to determining that the value of fulfilling the request is higher, the driving route to traverse the alternate transportation stop that is closer to the far side of the street rather than the initial transportation stop that is closer to the near side of the street.

Figure 11:
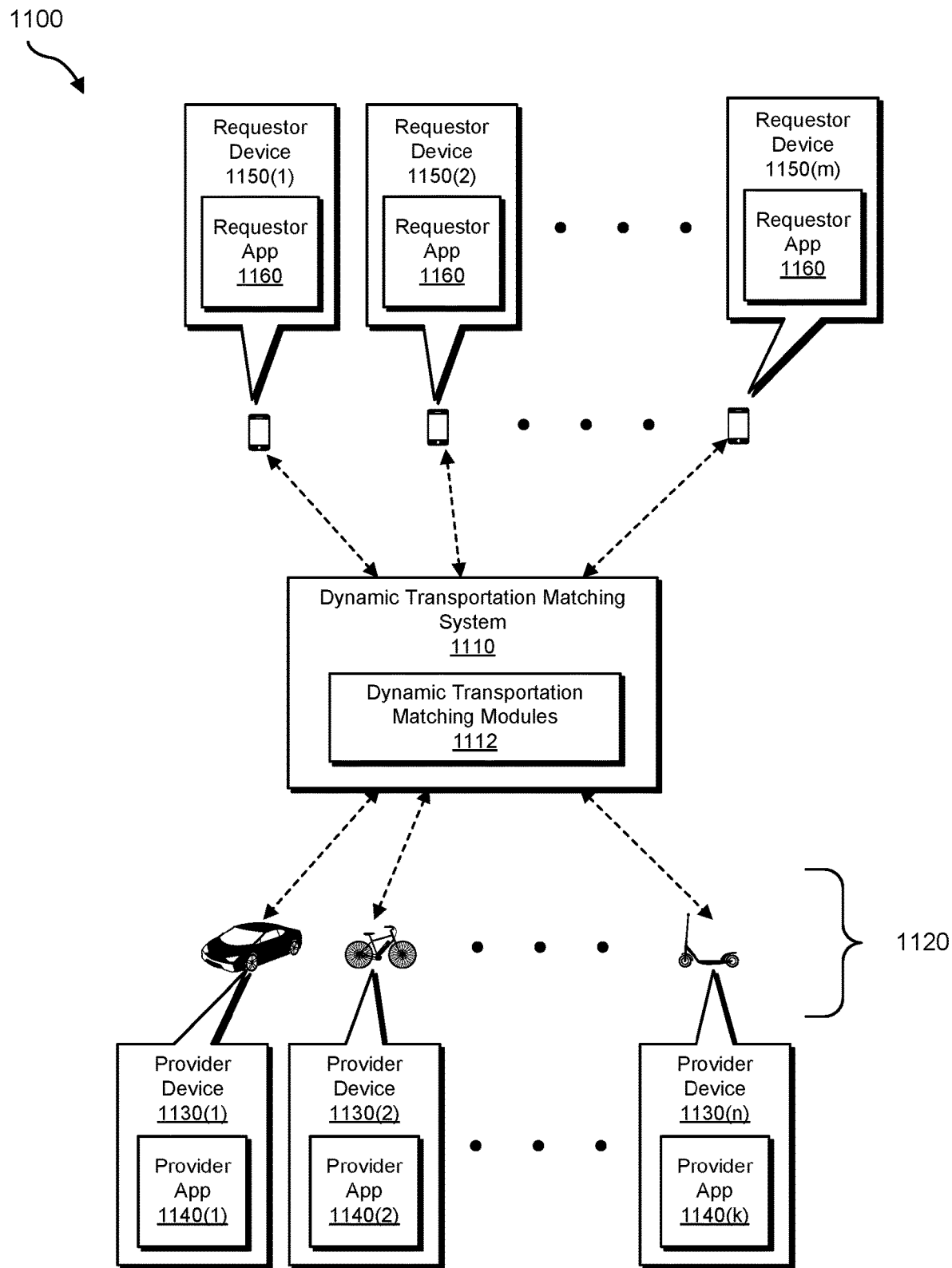
FIG. 11 is a block diagram of an example dynamic transportation management system.

FIG. 11 illustrates an example system 1100 for matching transportation requests with a dynamic transportation network. As shown in FIG. 11, a dynamic transportation matching system 1110 may be configured with one or more dynamic transportation matching modules 1112 that may perform one or more of the steps or operations described herein. Dynamic transportation matching system 1110 may represent any computing system and/or set of computing systems capable of matching transportation requests. Dynamic transportation matching system 1110 may be in communication with computing devices in each of a group of vehicles 1120. Vehicles 1120 may represent any vehicles that may fulfill transportation requests. In some examples, vehicles 1120 may include disparate vehicle types and/or models. For example, vehicles 1120 may include lane-bound vehicles and MMVs. In some examples, some of vehicles 1120 may be standard commercially available vehicles. According to some examples, some of vehicles 1120 may be owned by separate individuals (e.g., transportation providers). Furthermore, while, in some examples, many or all of vehicles 1120 may be human-operated, in some examples many of vehicles 1120 may also be autonomous (or partly autonomous). Accordingly, throughout the instant disclosure, references to a "transportation provider" (or "provider") may, where appropriate, refer to an operator of a human driven vehicle, an autonomous vehicle control system, an autonomous vehicle, an owner of an autonomous vehicle, an operator of an autonomous vehicle, an attendant of an autonomous vehicle, a vehicle piloted by a requestor, and/or an autonomous system for piloting a vehicle. While FIG. 11 does not specify the number of vehicles 1120, it may be readily appreciated that the systems described herein are applicable to hundreds of vehicles, thousands of vehicles, or more. In one example, dynamic transportation matching system 1110 may coordinate transportation matchings within a single region for 50,000 vehicles or more on a given day. In some examples, vehicles 1120 may collectively form a dynamic transportation network that may provide transportation supply on an on-demand basis to transportation requestors.

As mentioned above, dynamic transportation matching system 1110 may communicate with computing devices in each of vehicles 1120. The computing devices may be any suitable type of computing device. In some examples, one or more of the computing devices may be integrated into the respective vehicles 1120. In some examples, one or more of the computing devices may be mobile devices. For example, one or more of the computing devices may be smartphones. Additionally or alternatively, one or more of the computing devices may be tablet computers, personal digital assistants, or any other type or form of mobile computing device. According to some examples, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requestor and/or provider for a transportation matching application, a navigation application, and/or any other application suited for the use of requestors and/or providers). Additionally or alternatively, one or more of the computing devices may be devices suitable for installing in a vehicle and/or may be a vehicle's computer that has a transportation management system application installed on the computer in order to provide transportation services to transportation requestors and/or communicate with dynamic transportation matching system 1110.

As shown in FIG. 11, vehicles 1120 may include provider devices 1130(1)-(n) (e.g., whether integrated into the vehicle, permanently affixed to the vehicle, temporarily affixed to the vehicle, worn by a driver of the vehicle, etc.). In some examples, provider devices 1130 may include one or more provider apps 1140(1)-(k). Provider apps 1140(1)-(k) may represent any application, program, and/or module that may provide one or more services related to operating a vehicle and/or providing transportation matching services. For example, provider apps 1140(1)-(k) may include a transportation matching application for providers and/or one or more applications for matching MMVs with requestor devices. In some embodiments, different types of provider vehicles may be provisioned with different types of provider devices and/or different provider applications. For example, MMVs may be provisioned with provider devices that are configured with a provider application that enables transportation requestors to reserve and/or operate the MMVs while road-constrained and/or lane-bound vehicles (e.g., cars) may be provisioned with provider devices that are configured with a provider application that enables provider vehicle operators (e.g., transportation providers) to respond to requests from transportation requestors. In some examples, provider applications 1140(1)-(k) may match the user of provider apps 1140(1)-(k) (e.g., a transportation provider) with transportation requestors through communication with dynamic transportation matching system 1110. In addition, and as is described in greater detail below, provider apps 1140(1)-(k) may provide dynamic transportation management system 1110 with information about a provider (including, e.g., the current location of the provider and/or vehicle) to enable dynamic transportation management system 1110 to provide dynamic transportation matching and/or management services for the provider and one or more requestors. In some examples, provider apps 1140(1)-(k) may coordinate communications and/or a payment between a requestor and a provider. According to some embodiments, provider apps 1140(1)-(k) may provide a map service, a navigation service, a traffic notification service, and/or a geolocation service.

Additionally, as shown in FIG. 11, dynamic transportation matching system 1110 may communicate with requestor devices 1150(1)-(m). In some examples, requestor devices 1150 may include a requestor app 1160. Requestor app 1160 may represent any application, program, and/or module that may provide one or more services related to requesting transportation matching services. For example, requestor app 1160 may include a transportation matching application for requestors. In some examples, requestor app 1160 may match the user of requestor app 1160 (e.g., a transportation requestor) with transportation providers through communication with dynamic transportation matching system 1110. In addition, and as is described in greater detail below, requestor app 1160 may provide dynamic transportation management system 1110 with information about a requestor (including, e.g., the current location of the requestor) to enable dynamic transportation management system 1110 to provide dynamic transportation matching services for the requestor and one or more providers. In some examples, requestor app 1160 may coordinate communications and/or a payment between a requestor and a provider. According to some embodiments, requestor app 1160 may provide a map service, a navigation service, a traffic notification service, and/or a geolocation service.

Embodiments of the instant disclosure may include or be implemented in conjunction with a dynamic transportation matching system. A transportation matching system may arrange transportation on an on-demand and/or ad-hoc basis by, e.g., matching one or more transportation requestors with one or more transportation providers. For example, a transportation matching system may provide one or more transportation matching services for a networked transportation service, a ridesourcing service, a taxicab service, a car-booking service, an autonomous vehicle service, a personal mobility vehicle service, a micro-mobility service, or some combination and/or derivative thereof. The dynamic transportation matching system may include and/or interface with any of a variety of subsystems that may implement, support, and/or improve a transportation matching service. For example, the dynamic transportation matching system may include a matching system (e.g., that matches requestors to ride opportunities and/or that arranges for requestors and/or providers to meet), a mapping system, a navigation system (e.g., to help a provider reach a requestor, to help a requestor reach a provider, and/or to help a provider reach a destination), a reputation system (e.g., to rate and/or gauge the trustworthiness of a requestor and/or a provider), a payment system, and/or an autonomous or semi-autonomous driving system. The dynamic transportation matching system may be implemented on various platforms, including a requestor-owned mobile device, a computing system installed in a vehicle, a requestor-owned mobile device, a server computer system, or any other hardware platform capable of providing transportation matching services to one or more requestors and/or providers.

While various examples provided herein relate to transportation, embodiments of the instant disclosure may include or be implemented in conjunction with a dynamic matching system applied to one or more services instead of and/or in addition to transportation services. For example, embodiments described herein may be used to match service providers with service requestors for any service.

Figure 12:
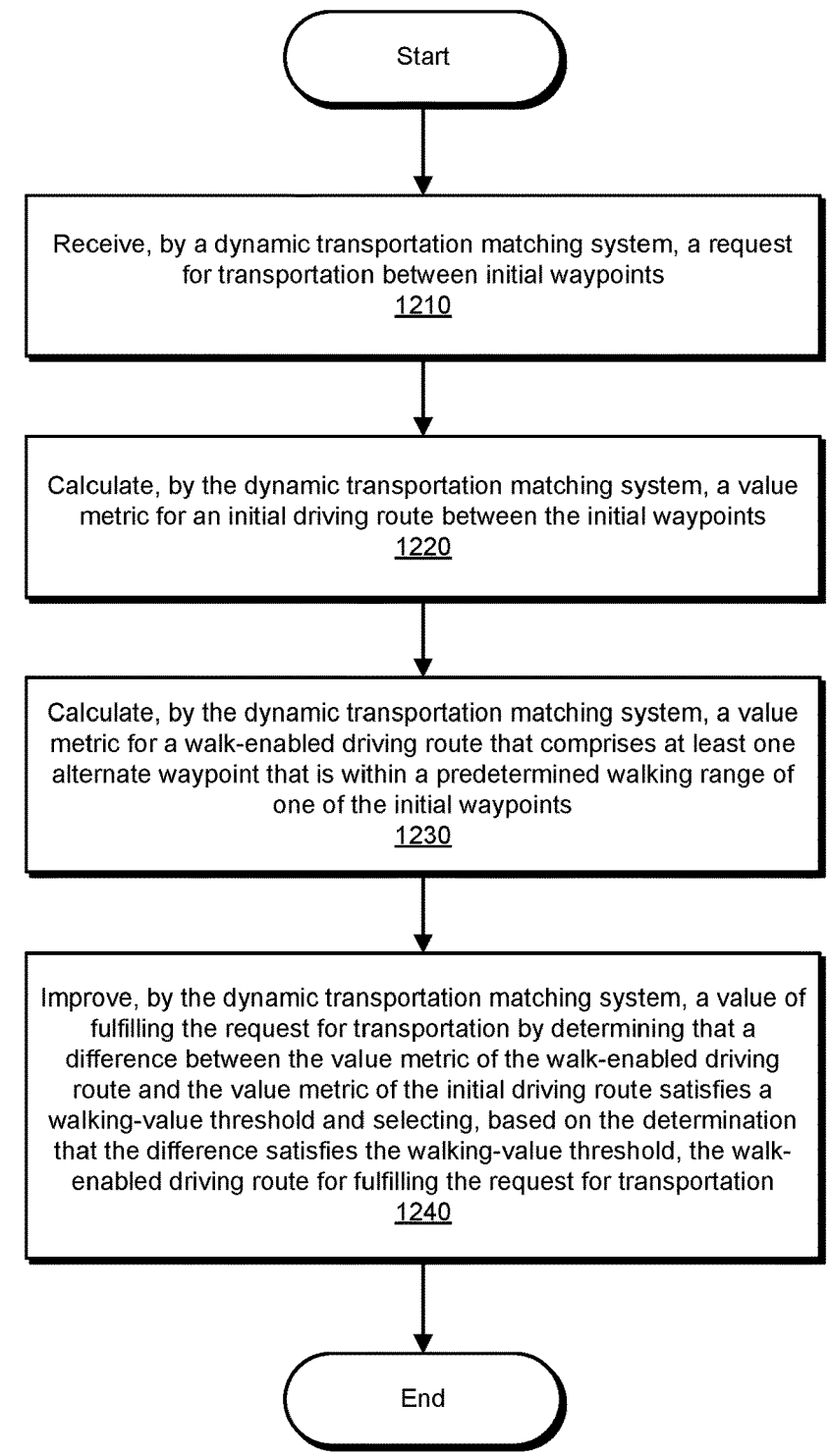
FIG. 12 is a flow diagram of an example method for selecting improved routes for fulfilling transportation requests.

In some embodiments, the systems described herein may improve a value metric for the dynamic transportation matching system by mapping a walk-enabled route. FIG. 12 illustrates an example computer-implemented method 1200 for selecting improved routes for fulfilling transportation requests. As shown in FIG. 12, at step 1210, the systems described herein may receive, by a dynamic transportation matching system, a request for transportation between initial waypoints. In some embodiments, the initial waypoints may include a pickup waypoint (e.g., the current location of a transportation requestor) and/or a drop-off waypoint (e.g., the destination of the request). In some examples, at step 1220, the systems described herein may calculate, by the dynamic transportation matching system, a value metric for an initial driving route between the initial waypoints. In some examples, the term "value metric" may generally refer to any measurement of the value of a transportation route. In some embodiments, the systems described herein may calculate the value in terms of travel time, distance, ETA, ETD, monetary cost, route complexity, user experience, requestor convenience, provider convenience, and/or a combination of the aforementioned and/or any other suitable metrics. In some embodiments, the initial driving route may start at one initial waypoint, end at another initial waypoint, and/or include no expected walking on the part of the transportation requestor. In some examples, the term "driving route," as used herein, may refer to a route with no explicitly mapped walking segments (e.g., a requestor may walk from the center of an apartment complex or airport to the nearest street, but this walk may not be an explicitly mapped part of the driving route). Additionally or alternatively, the term "driving route" may refer to any route that includes at least one driving segment, regardless of whether additional portions of the route include walking.

At step 1230, the systems described herein may calculate, by the dynamic transportation matching system, a value metric for a walk-enabled driving route that includes at least one alternate waypoint that is within a predetermined walking range of one of the initial waypoints. In some examples, the term "walk-enabled driving route" or "walk-enabled route" may refer to a transportation route that includes at least one explicitly mapped walking segment. In some embodiments, a predetermined walking range may be measured by distance or length, such as one block, half a mile, or one mile. Additionally or alternatively, a predetermined walking range may be measured by expected traversal time (e.g., an expected time for a requestor to traverse a walking route between waypoints), such as a one-minute walk, a three-minute walk, or a five-minute walk. In some embodiments, the systems described herein may calculate a predetermined walking range based at least in part on previous transportation requestor behavior (e.g., a longer range for a requestor who has previously demonstrated willingness to walk farther) and/or a walking range preference set by the transportation requestor who initiated the request for transportation. Additionally or alternatively, the systems described herein may calculate a predetermined walking range based at least in part on environmental conditions. For example, the systems described herein may calculate a shorter walking range in inclement weather, late at night, and/or over difficult terrain. In at least one embodiment, the systems described herein may calculate the value metric for the walk-enabled driving route by determining a level of complexity of the walk-enabled driving route (e.g., a level of complexity of traversal for a transportation provider traversing any driving portions of the walk-enabled driving route, a level of complexity of traversal for a requestor traversing any walking portions of the walk-enabled driving route, etc.).

At step 1240, the systems described herein may improve, by the dynamic transportation matching system, a value of fulfilling the request for transportation by determining that a difference between the value metric of the walk-enabled driving route and the value metric of the initial driving route satisfies a walking-value threshold and selecting, based on the determination that the difference satisfies the walking-value threshold, the walk-enabled driving route for fulfilling the request for transportation. In some embodiments, any walk-enabled driving route with a higher value than the initial driving route may satisfy the walking-value threshold. In some embodiments, the systems described herein may calculate a walking-value threshold based at least in part on one or more characteristics of the walk-enabled driving route. For example, the systems described herein may select the walk-enabled driving route over the initial driving route if the ratio of the expected traversal time and/or distance walked by the transportation requestor compared to the expected trip time and/or distance saved for the trip satisfies the walking-value threshold. In some examples, after selecting the walk-enabled driving route, the systems described herein may send directions to a provider device and/or a requestor device. In some embodiments, the systems described herein may direct a provider device and/or requestor device to display directions (e.g., on a map) for traversing the selected route.

Figure 13:
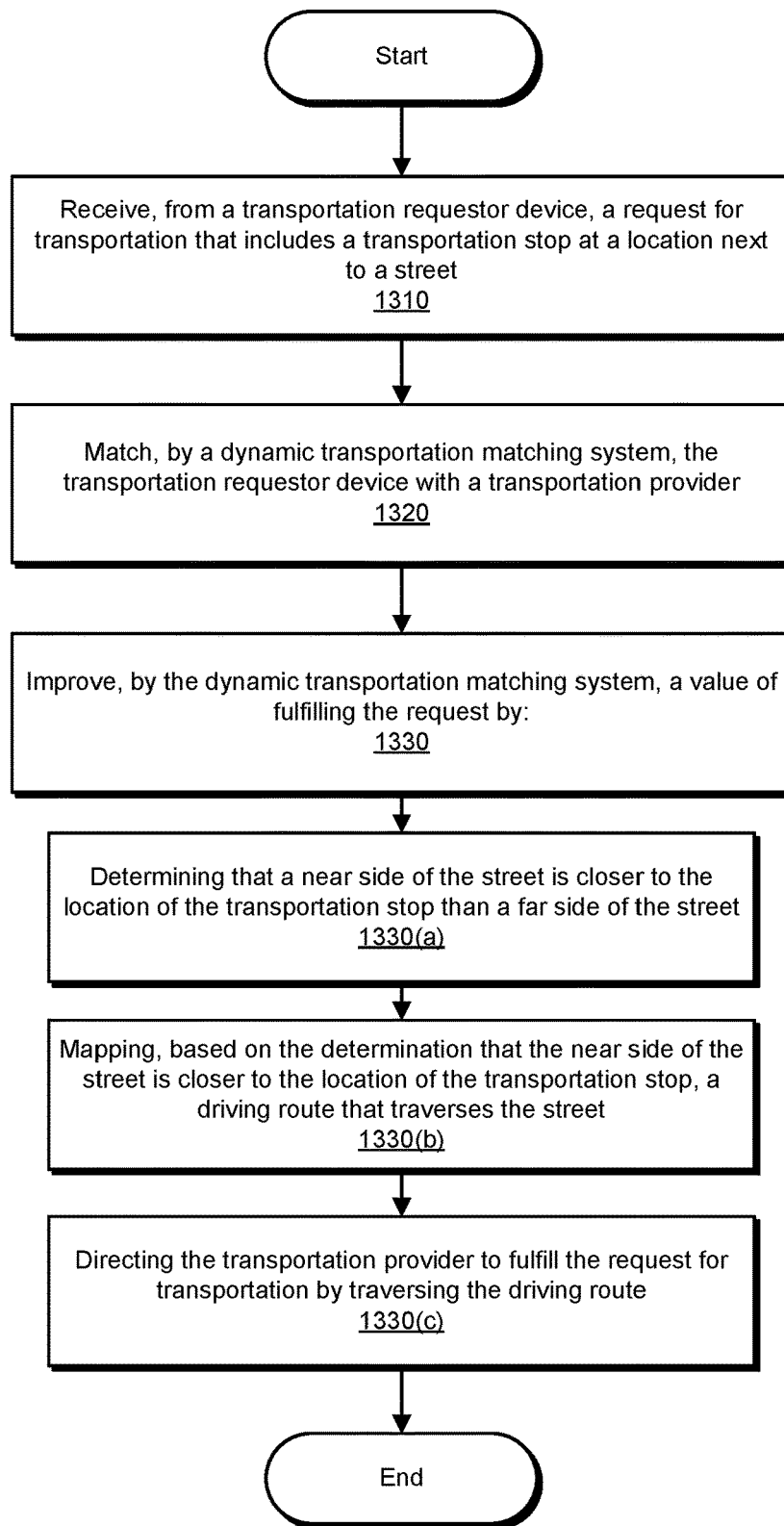
FIG. 13 is a flow diagram of an example method for selecting improved routes for fulfilling transportation requests.

In some embodiments, the systems described herein may account for the side of the street and/or bearing of the transportation provider when matching requestor devices and providers and/or mapping routes. FIG. 13 illustrates an example computer-implemented method 1300 for selecting improved routes for fulfilling transportation requests. As shown in FIG. 13, at step 1310, the systems described herein may receive, from a transportation requestor device, a request for transportation that includes a transportation stop at a location next to a street. At step 1320, the systems described herein may match, by a dynamic transportation matching system, the transportation requestor device with a transportation provider. At step 1330, the systems described herein may improve, by the dynamic transportation matching system, a value of fulfilling the request by, at step 1330(*a*), determining that a near side of the street is closer to the location of the transportation stop than a far side of the street, at step 1330(*b*), mapping, based on the determination that the near side of the street is closer to the location of the transportation stop, a driving route that traverses the street, and at step 1330(*c*), directing the transportation provider to fulfill the request for transportation by traversing the driving route.

Figure 14:
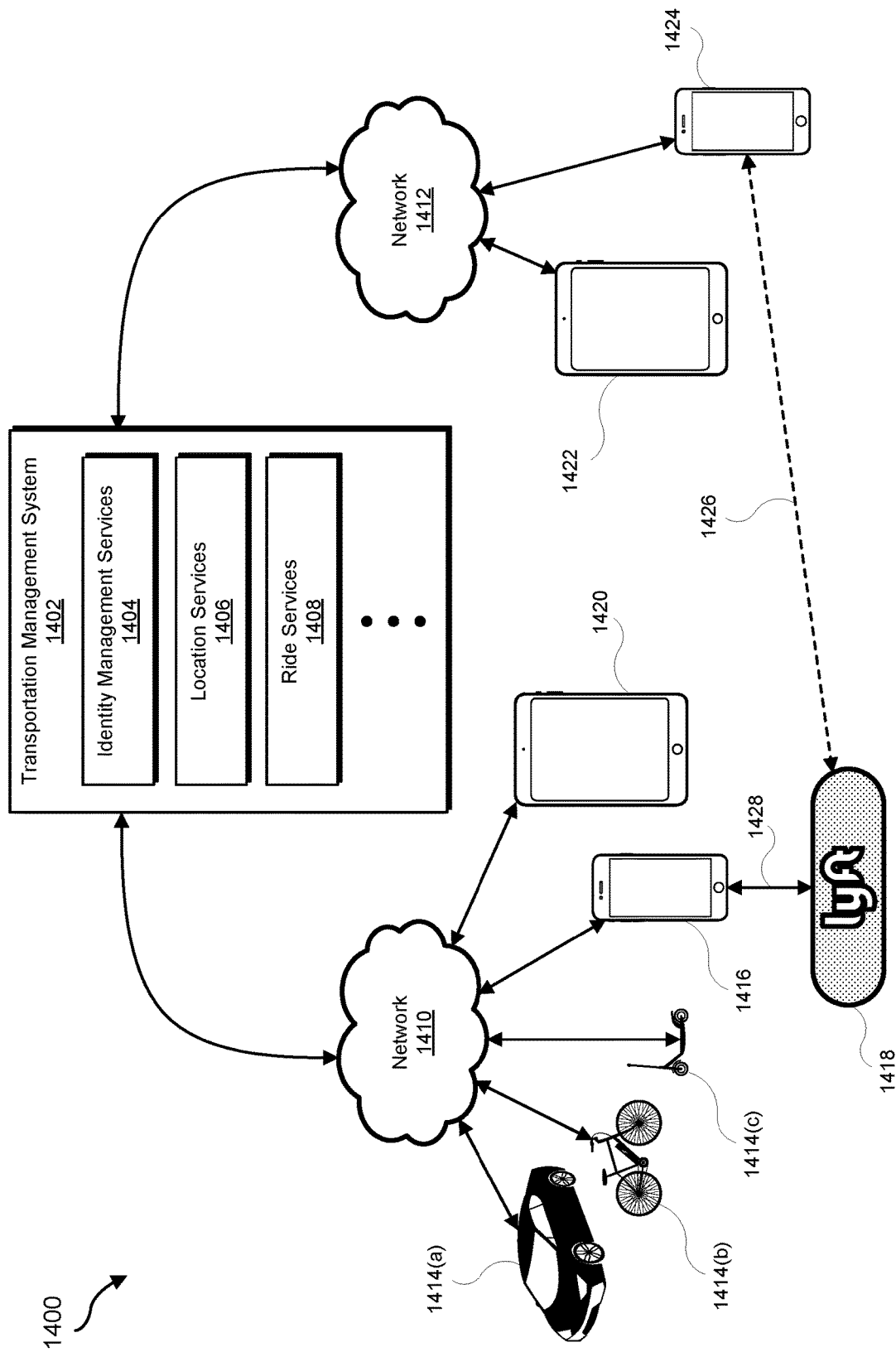
FIG. 14 is an illustration of an example requestor/provider management environment.

FIG. 14 shows a transportation management environment 1400, in accordance with various embodiments. As shown in FIG. 14, a transportation management system 1402 may run one or more services and/or software applications, including identity management services 1404, location services 1406, ride services 1408, and/or other services. Although FIG. 14 shows a certain number of services provided by transportation management system 1402, more or fewer services may be provided in various implementations. In addition, although FIG. 14 shows these services as being provided by transportation management system 1402, all or a portion of any of the services may be processed in a distributed fashion. For example, computations associated with a service task may be performed by a combination of transportation management system 1402 (including any number of servers, databases, etc.), one or more devices associated with a provider (e.g., devices integrated with managed vehicle 1414(*a*), managed vehicle 1414(*b*), and/or managed vehicle 1414(*c*); provider computing devices 1416 and tablets 1420; and transportation management vehicle devices 1418), and/or one or more more devices associated with a ride requestor (e.g., the requestor's computing devices 1424 and tablets 1422). In some embodiments, transportation management system 1402 may include one or more general purpose computers, server computers, clustered computing systems, cloud-based computing systems, and/or any other computing systems or arrangements of computing systems. Transportation management system 1402 may be configured to run any or all of the services and/or software components described herein. In some embodiments, the transportation management system 1402 may include an appropriate operating system and/or various server applications, such as web servers capable of handling hypertext transport protocol (HTTP) requests, file transfer protocol (FTP) servers, database servers, etc.

In some embodiments, identity management services 1404 may be configured to perform authorization services for requestors and providers and/or manage their interactions and/or data with transportation management system 1402. This may include, e.g., authenticating the identity of providers and determining that they are authorized to provide services through transportation management system 1402. Similarly, requestors' identities may be authenticated to determine whether they are authorized to receive the requested services through transportation management system 1402. Identity management services 1404 may also manage and/or control access to provider and/or requestor data maintained by transportation management system 1402, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 1402 may also manage and/or control access to provider and/or requestor data stored with and/or obtained from third-party systems. For example, a requester or provider may grant transportation management system 1402 access to a third-party email, calendar, or task management system (e.g., via the user's credentials). As another example, a requestor or provider may grant, through a mobile device (e.g., provider computing device 1416, tablet 1420, tablet 1422, or requestor computing device 1424), a transportation application associated with transportation management system 1402 access to data provided by other applications installed on the mobile device. In some examples, such data may be processed on the client and/or uploaded to transportation management system 1402 for processing.

In some embodiments, transportation management system 1402 may provide ride services 1408, which may include ride matching and/or management services to connect a requestor to a provider. For example, after identity management services 1404 has authenticated the identity a ride requestor, ride services 1408 may attempt to match the requestor with one or more ride providers. In some embodiments, ride services 1408 may identify an appropriate provider using location data obtained from location services 1406. Ride services 1408 may use the location data to identify providers who are geographically close to the requestor (e.g., within a certain threshold distance or travel time) and/or who are otherwise a good match with the requestor. Ride services 1408 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services 1408 may use rule-based algorithms and/or machine-learning models for matching requestors and providers.

Transportation management system 1402 may communicatively connect to various devices through network 1410 and/or network 1412. Networks 1410 and 1412 may include any combination of interconnected networks configured to send and/or receive data communications using various communication protocols and transmission technologies. In some embodiments, networks 1410 and/or 1412 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1410 and/or 1412 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 902.12 family of standards, Bluetooth, Bluetooth Low Energy, Near Field Communication (NFC), Z-Wave, and ZigBee). In various embodiments, networks 1410 and/or 1412 may include any combination of networks described herein or any other type of network capable of facilitating communication across networks 1410 and/or 1412.

In some embodiments, transportation management vehicle device 1418 may include a provider communication device configured to communicate with users, such as drivers, passengers, pedestrians, and/or other users. In some embodiments, transportation management vehicle device 1418 may communicate directly with transportation management system 1402 or through another provider computing device, such as provider computing device 1416. In some embodiments, a requestor computing device (e.g., requestor computing device 1424) may communicate via a connection 1426 directly with transportation management vehicle device 1418 via a communication channel and/or connection, such as a peer-to-peer connection, Bluetooth connection, NFC connection, ad hoc wireless network, and/or any other communication channel or connection. Although FIG. 14 shows particular devices communicating with transportation management system 1402 over networks 1410 and 1412, in various embodiments, transportation management system 1402 may expose an interface, such as an application programming interface (API) or service provider interface (SPI) to enable various third parties which may serve as an intermediary between end users and transportation management system 1402.

In some embodiments, devices within a vehicle may be interconnected. For example, any combination of the following may be communicatively connected: vehicle 1414, provider computing device 1416, provider tablet 1420, transportation management vehicle device 1418, requestor computing device 1424, requestor tablet 1422, and any other device (e.g., smart watch, smart tags, etc.). For example, transportation management vehicle device 1418 may be communicatively connected to provider computing device 1416 and/or requestor computing device 1424. Transportation management vehicle device 1418 may establish communicative connections, such as connection 1426 and connection 1428, to those devices via any suitable communication technology, including, e.g., WLAN technologies implementing the IEEE 902.12 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 1402 using applications executing on their respective computing devices (e.g., provider computing device 1416, transportation management vehicle device 1418, provider tablet 1420, and/or a computing device integrated within vehicle 1414), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1414 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 1402. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 15:
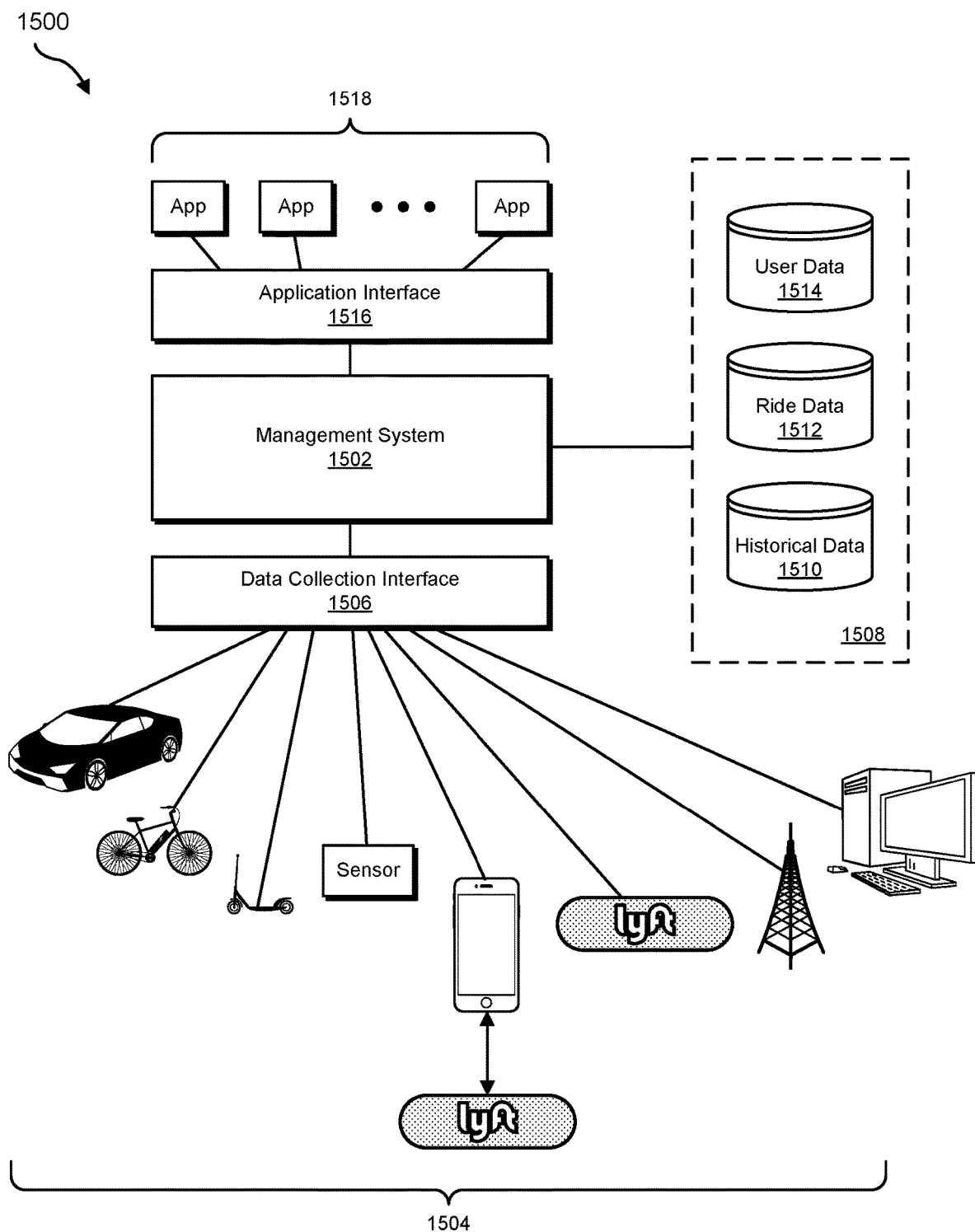
FIG. 15 is an illustration of an example data collection and application management system.

FIG. 15 shows a data collection and application management environment 1500, in accordance with various embodiments. As shown in FIG. 15, management system 1502 may be configured to collect data from various data collection devices 1504 through a data collection interface 1506. As discussed above, management system 1502 may include one or more computers and/or servers or any combination thereof. Data collection devices 1504 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1506 can include, e.g., an extensible device framework configured to support interfaces for each data collection device. In various embodiments, data collection interface 1506 may be extended to support new data collection devices as they are released and/or to update existing interfaces to support changes to existing data collection devices. In various embodiments, data collection devices may communicate with data collection interface 1506 over one or more networks. The networks may include any network or communication protocol as would be recognized by one of ordinary skill in the art, including those networks discussed above.

As shown in FIG. 15, data received from data collection devices 1504 can be stored in data 1508. Data 1508 may include one or more data stores, such as databases, object storage systems and services, cloud-based storage services, and other data stores. For example, various data stores may be implemented on a non-transitory storage medium accessible to management system 1502, such as historical data 1510, ride data 1512, and user data 1514. Data stores 1508 can be local to management system 1502, or remote and accessible over a network, such as those networks discussed above or a storage-area network or other networked storage system. In various embodiments, historical data 1510 may include historical traffic data, weather data, request data, road condition data, or any other data for a given region or regions received from various data collection devices. Ride data 1512 may include route data, request data, timing data, and other ride related data, in aggregate and/or by requestor or provider. User data 1514 may include user account data, preferences, location history, and other user-specific data. Although certain data stores are shown by way of example, any data collected and/or stored according to the various embodiments described herein may be stored in data stores 1508.

As shown in FIG. 15, an application interface 1516 can be provided by management system 1502 to enable various apps 1518 to access data and/or services available through management system 1502. Apps 1518 may run on various user devices (including provider and requestor computing devices, such as those discussed above) and/or may include cloud-based or other distributed apps configured to run across various devices (e.g., computers, servers, or combinations thereof). Apps 1518 may include, e.g., aggregation and/or reporting apps which may utilize data 1508 to provide various services (e.g., third-party ride request and management apps). In various embodiments, application interface 1516 can include an API and/or SPI enabling third party development of apps 1518. In some embodiments, application interface 1516 may include a web interface, enabling web-based access to data 1508 and/or services provided by management system 1502. In various embodiments, apps 1518 may run on devices configured to communicate with application interface 1516 over one or more networks. The networks may include any network or communication protocol as would be recognized by one of ordinary skill in the art, including those networks discussed above, in accordance with an embodiment of the present disclosure.

While various embodiments of the present disclosure are described in terms of a networked transportation system in which the ride providers are human drivers operating their own vehicles, in other embodiments, the techniques described herein may also be used in environments in which ride requests are fulfilled using autonomous or semi-autonomous vehicles. For example, a transportation management system of a networked transportation service may facilitate the fulfillment of ride requests using both human drivers and autonomous vehicles. Additionally or alternatively, without limitation to transportation services, a matching system for any service may facilitate the fulfillment of requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" or "non-transitory memory" generally refers to any type or form of volatile or non-volatile storage device or medium capable of storing data and/or computer-readable instructions. In one example, a memory device or non-transitory memory may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" or "hardware processor" generally refers to any type or form of hardware-implemented processing unit capable of interpreting and/or executing computer-readable instructions. In one example, a physical processor or hardware processor may access and/or modify one or more modules stored in the above-described memory device. Examples of physical processors or hardware processors may include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps or operations described and/or illustrated herein are given by way of example only and can be varied as desired. For example, while the steps or operations illustrated and/or described herein may be shown or discussed in a particular order, these steps or operations do not necessarily need to be performed in the order illustrated or discussed. The various exemplary methods described and/or illustrated herein may also omit one or more of the steps or operations described or illustrated herein or include additional steps or operations in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving, from a transportation requestor device, a request for transportation that comprises a transportation stop at a location next to a street;
   matching, by a dynamic transportation matching system, the transportation requestor device with a transportation provider based on a matching algorithm that scores transportation providers based on a plurality of provider attributes and a plurality of transportation requestor attributes; and
   improving, by the dynamic transportation matching system, a value of fulfilling the request by:
      determining that a near side of the street is closer to the location of the transportation stop than a far side of the street;
      mapping a driving route that traverses the street, the mapping comprising selecting the driving route based on the determination that the near side of the street is closer to the location of the transportation stop than the far side of the street; and
      directing, via a user interface that dynamically updates navigational information during fulfilment of the request, the transportation provider to fulfill the request for transportation by traversing the driving route;
   wherein matching the transportation requestor device with the transportation provider is based at least in part on the transportation stop being closer to the near side of the street.

2. The computer-implemented method of claim 1, wherein the driving route is mapped to traverse the near side of the street.

3. The computer-implemented method of claim 1, further comprising sending, to the transportation requestor device, an estimated time of arrival of the transportation provider at the transportation stop calculated based at least in part on the transportation stop being closer to the near side of the street.

4. The computer-implemented method of claim 1, wherein mapping the driving route comprises sending, to an application programming interface:
   a current bearing of the transportation provider; and
   information that the transportation stop is closer to the near side of the street.

5. The computer-implemented method of claim 1, wherein calculating the driving route comprises:
   determining that the transportation stop comprises an unauthorized location for the transportation provider to stop; and
   mapping, in response to determining that the transportation stop comprises the unauthorized location, the driving route to traverse an alternate transportation stop near the transportation stop.

6. The computer-implemented method of claim 1, wherein mapping the driving route comprises:
   determining that the value of fulfilling the request is higher if the driving route comprises an alternate transportation stop that is closer to the far side of the street instead of the transportation stop that is closer to the near side of the street; and
   mapping, in response to determining that the value of fulfilling the request is higher, the driving route to traverse the alternate transportation stop that is closer to the far side of the street.

7. The computer-implemented method of claim 1, wherein directing the transportation provider to fulfill the request for transportation by traversing the driving route comprises directing a provider device to display, via a user interface that comprises a map, directions for traversing the driving route that show the transportation stop on the near side of the street.

8. The computer-implemented method of claim 1, wherein the transportation stop comprises at least one of:
   a drop-off location for a transportation requestor associated with the transportation requestor device; and
   a pickup location for a transportation requestor associated with the transportation requestor device.

9. The computer-implemented method of claim 1, wherein the request for transportation comprises an indication that a user of the transportation requestor device has opted in to having requests for transportation fulfilled via walk-enabled driving routes.

10. The computer-implemented method of claim 1, further comprising directing, by the dynamic transportation matching system via the transportation requestor device, the user of the transportation requestor device to walk to the near side of the street.

11. A system comprising:
   a non-transitory memory; and one or more hardware processors configured to execute instructions from the non-transitory memory to perform operations comprising:
  receiving, from a transportation requestor device, a request for transportation that comprises a transportation stop at a location next to a street;
  matching, by a dynamic transportation matching system, the transportation requestor device with a transportation provider based on a matching algorithm that scores transportation providers based on a plurality of provider attributes and a plurality of transportation requestor attributes; and
  improving, by the dynamic transportation matching system, a value of fulfilling the request by:
    determining that a near side of the street is closer to the location of the transportation stop than a far side of the street;
    mapping a driving route that traverses the street, the mapping comprising selecting the driving route based on the determination that the near side of the street is closer to the location of the transportation stop than the far side of the street; and
    directing, via a user interface that dynamically updates navigational information during fulfilment of the request, the transportation provider to fulfill the request for transportation by traversing the driving route;
  wherein matching the transportation requestor device with the transportation provider is based at least in part on the transportation stop being closer to the near side of the street.

12. The system of claim 11, wherein the driving route is mapped to traverse the near side of the street.

13. The system of claim 11, wherein the operations further comprise sending, to the transportation requestor device, an estimated time of arrival of the transportation provider at the transportation stop calculated based at least in part on the transportation stop being closer to the near side of the street.

14. The system of claim 11, wherein mapping the driving route comprises sending, to an application programming interface:
  a current bearing of the transportation provider; and
  information that the transportation stop is closer to the near side of the street.

15. The system of claim 11, wherein calculating the driving route comprises:
  determining that the transportation stop comprises an unauthorized location for the transportation provider to stop; and
  mapping, in response to determining that the transportation stop comprises the unauthorized location, the driving route to traverse an alternate transportation stop near the transportation stop.

16. The system of claim 11, wherein mapping the driving route comprises:
  determining that the value of fulfilling the request is higher if the driving route comprises an alternate transportation stop that is closer to the far side of the street instead of the transportation stop that is closer to the near side of the street; and
  mapping, in response to determining that the value of fulfilling the request is higher, the driving route to traverse the alternate transportation stop that is closer to the far side of the street.

17. The system of claim 11, wherein directing the transportation provider to fulfill the request for transportation by traversing the driving route comprises directing a provider device to display, via a user interface that comprises a map, directions for traversing the driving route that show the transportation stop on the near side of the street.

18. The system of claim 11, wherein the transportation stop comprises at least one of:
  a drop-off location for a transportation requestor associated with the transportation requestor device; and
  a pickup location for a transportation requestor associated with the transportation requestor device.

19. A non-transitory computer-readable medium comprising computer-readable instructions that, when executed by at least one processor of a computing device, cause the computing device to:
  receive, from a transportation requestor device, a request for transportation that comprises a transportation stop at a location next to a street;
  match, by a dynamic transportation matching system, the transportation requestor device with a transportation provider based on a matching algorithm that scores transportation providers based on a plurality of provider attributes and a plurality of transportation requestor attributes; and
  improve, by the dynamic transportation matching system, a value of fulfilling the request by:
  determining that a near side of the street is closer to the location of the transportation stop than a far side of the street;
  mapping a driving route that traverses the street, the mapping comprising selecting the driving route based on the determination that the near side of the street is closer to the location of the transportation stop than the far side of the street; and
  directing, via a user interface that dynamically updates navigational information during fulfilment of the request, the transportation provider to fulfill the request for transportation by traversing the driving route;
  wherein matching the transportation requestor device with the transportation provider is based at least in part on the transportation stop being closer to the near side of the street.

20. The non-transitory computer-readable medium of claim 19, wherein the driving route is mapped to traverse the near side of the street.

* * * * *